(12) United States Patent
Hiraguchi et al.

(10) Patent No.: US 7,301,728 B2
(45) Date of Patent: Nov. 27, 2007

(54) RECORDING MEDIUM CARTRIDGE HAVING AN ACCOMMODATION PORTION FOR A NONCONTACT-TYPE MEMORY

(75) Inventors: Kazuo Hiraguchi, Kanagawa (JP); Daisuke Takahashi, Kanagawa (JP); Shozo Onmori, Kanagawa (JP); Teruo Ashikawa, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/497,285

(22) Filed: Aug. 2, 2006

(65) Prior Publication Data

US 2006/0268458 A1 Nov. 30, 2006

Related U.S. Application Data

(62) Division of application No. 09/851,991, filed on May 10, 2001, now Pat. No. 7,126,791.

(30) Foreign Application Priority Data

May 11, 2000 (JP) .............................. 2000-138015

(51) Int. Cl.
*G11B 23/30* (2006.01)
*G11B 23/087* (2006.01)
*G11B 23/033* (2006.01)
*G11B 23/107* (2006.01)

(52) U.S. Cl. ...................................... 360/132
(58) Field of Classification Search ................ 360/132; 242/341–348.4
See application file for complete search history.

(56) References Cited

U.S. PATENT DOCUMENTS

| 5,862,117 | A | 1/1999 | Fuentes et al. |
| 6,065,701 | A | 5/2000 | Tanimura et al. |
| 6,201,474 | B1 * | 3/2001 | Brady et al. ............. 340/572.8 |
| 6,304,416 | B1 | 10/2001 | McAllister et al. |
| 6,452,749 | B1 | 9/2002 | Ota et al. |
| 6,496,314 | B1 | 12/2002 | Ota et al. |
| 6,556,378 | B1 | 4/2003 | Ota et al. |
| 6,577,471 | B1 | 6/2003 | Morita et al. |
| 6,667,846 | B2 | 12/2003 | Kano et al. |
| 6,674,599 | B1 | 1/2004 | Rae et al. |
| 2002/0023956 | A1 | 2/2002 | Kaneko |
| 2004/0165313 | A1 | 8/2004 | Onmori et al. |

FOREIGN PATENT DOCUMENTS

| EP | 0 924 701 A2 | 6/1999 |
| EP | 1 041 562 | 10/2000 |
| EP | 1 104 929 A1 | 6/2001 |
| JP | 10-149600 | 6/1998 |
| JP | 10-172211 | 6/1998 |
| JP | 10-172261 | 6/1998 |
| JP | 10-172263 | 6/1998 |
| JP | 10-177776 | 6/1998 |

(Continued)

*Primary Examiner*—Craig A. Renner
(74) *Attorney, Agent, or Firm*—Sughrue Mion, PLLC

(57) ABSTRACT

The recording medium cartridge includes a cartridge case containing a recording medium and a noncontact-type memory having an IC section for storing information and performing signal processing and an antenna section for transmitting and receiving signals. The antenna section of the memory is placed in a region furthest from metallic parts.

10 Claims, 15 Drawing Sheets

FOREIGN PATENT DOCUMENTS

| | | |
|---|---|---|
| JP | 10-188522 | 7/1998 |
| JP | 10-199066 | 7/1998 |
| JP | 10-199067 | 7/1998 |
| JP | 10-199216 | 7/1998 |
| JP | 10-214475 | 8/1998 |
| JP | 10-214476 | 8/1998 |
| JP | 10-214477 | 8/1998 |
| JP | 10-222890 | 8/1998 |
| JP | 10-255441 | 9/1998 |
| JP | 10-269744 | 10/1998 |
| JP | 11-317050 | 11/1999 |
| JP | 2000-36178 | 2/2000 |
| WO | WO 00/45474 A1 | 1/2000 |
| WO | WO 00/17880 | 3/2000 |

\* cited by examiner

US 7,301,728 B2

RECORDING MEDIUM CARTRIDGE HAVING AN ACCOMMODATION PORTION FOR A NONCONTACT-TYPE MEMORY

This is a divisional of application Ser. No. 09/851,991 filed May 10, 2001 now U.S. Pat. No. 7,126,791. The entire disclosure of the prior application, application Ser. No. 09/851,991 is considered part of the disclosure of the present application and is hereby incorporated by reference.

BACKGROUND OF THE INVENTION

1. Field of the Invention

The present invention relates to a recording medium cartridge which incorporates a magnetic recording medium, such as a magnetic tape or a magnetic disk, or an optical recording medium, such as a magneto-optical disc or an optical disc, and which is, for example, a magnetic tape cassette or a magnetic tape cartridge. That is, the present invention belongs to the technical field of a recording medium cartridge formed by accommodating a recording medium, e.g., a magnetic recording medium, such as a magnetic tape or a magnetic disk, or an optical recording medium in a cartridge case. More particularly, the present invention relates to a recording medium cartridge having, for example, a noncontact-type memory (IC memory) called a cartridge memory (CM), in which are recorded information (data) on the recording medium cartridge and information (data) on the contents of information (data) recorded on a recording medium accommodated in the recording medium cartridge, and which is, for example, set in or, preferably, attached to the cartridge in such a manner that information can be easily read from or written to the memory. The cartridge memory has an IC section (IC memory) for storing information and performing signal processing, and an antenna section for transmitting and receiving signals to transfer data.

The present invention also relates to a cartridge label for use in various cartridges incorporating various recording mediums, e.g., a magnetic tape, a magnetic disk, and an optical recording medium and, more particularly, to a cartridge label having a noncontact-type memory (IC memory, cartridge memory (CM)) for recording information on the recording medium cartridge and information (data) on the contents of information (data) recorded on a recording medium accommodated in the recording medium cartridge.

2. Description of the Related Art

Compact lightweight magnetic tape cassettes and magnetic tape cartridges capable of recording digital signals at a high density are known. For example, a digital audio tape (DAT) is known as a magnetic tape cassette for recording an analog speech signal by converting the analog signal into a digital signal, e.g., a pulse-code-modulated (PCM) signal and/or for reproducing an analog signal. As small magnetic tape cassettes and magnetic tape cartridges for recording computer data, those specified in accordance with, for example, JISX6127 (1992), JISX6129 (1993), JISX6130 (1996) and JISX6141 (1993) in the Japanese Industrial Standards (JIS) with respect to the structure, size, etc., are known.

Various magnetic tape cassettes, magnetic tape cartridges and magnetic (or magneto-optical) disk cartridges are known as external storage means for computers or the like. In particular, recording medium cartridges used as recording mediums for computer memory backup, for example, include those of a one-reel type in which a magnetic tape is wound around a single reel rotatably accommodated in a cartridge case, those of a type having a single magnetic disk (or magneto-optical disc) rotatably accommodated in a cartridge case, and those of a type accommodating a pair of winding hubs around which a magnetic tape is wound (including, for example, those of a type having an opening specified in accordance with the above-mentioned JISX6141, etc., with respect to the structure, size, etc.). Such magnetic tape cartridges and other recording medium cartridges are used for, for example, saving computer data or the like and for recording important information.

Various sorts of information are recorded on recording medium cartridges such as magnetic tape cartridge. To identify the contents of recorded information and the kind of a magnetic tape or the like from a magnetic tape, a magnetic disk, a magneto-optical disc or an optical disc (hereinafter typified by a magnetic tape) without reading the information itself, an arrangement has been devised in which a noncontact-type memory called a cartridge memory (CM) and using an IC memory in the form of an IC chip capable of writing and reading information in a noncontact manner is provided separately from the magnetic tape or the like and attached to the cartridge case. Schemes to putting recording medium cartridges using such a noncontact-type memory to practical use are being advanced. Conventionally, such a cartridge memory is of an internal type to be attached to an internal portion of a cartridge case by considering increasing drive design variations and protection against attachment of extraneous matters and exertion of an impact to the cartridge memory.

This cartridge memory is intended to record information separately from information recorded on a recording medium such as a magnetic tape, has an IC section (IC memory) for storing information and performing signal processing and an antenna section for transmitting and receiving signals, and is capable of information read/write from or to the IC section in a noncontact manner without using terminals or the like for connection. As described below, the cartridge memory itself has no power source and operates to record information in the form of electrical signal on the basis of an electromagnetic induction system using a current induced by electromagnetic induction or an electrostatic system in which a signal output from a signal (data) read/write means (reader/writer) provided in an apparatus (deck) for recording and reproducing magnetic information or a signal transmitting/receiving means (antenna) used for the read/write means is utilized.

Japanese Patent Laid-open Publication No. 11-317050 discloses a one-reel type magnetic tape cartridge having such a cartridge memory.

As shown in FIG. 31, this magnetic tape cartridge 200 has a cartridge memory 208 constituted by a noncontact memory having an antenna 204 for transmitting and receiving signals and an IC section 206, and the cartridge memory 208 is provided in an outer casing (cartridge case) 210. The illustrated magnetic tape cartridge 200 is ordinarily loaded in a recording and reproduction apparatus (deck) (not shown) in a direction indicated by arrow 202 in the figure.

The IC section 206 is, for example, a well-known storage device(memory device) in the form of an IC chip, e.g., and IC memory capable of inputting and outputting information (data) in the form of electrical signal, and stores information about the magnetic tape cartridge 200, information about the contents of information recorded on the magnetic tape, etc.

The antenna 204 is a coil antenna for transmitting and receiving data and for receiving driving power. The antenna 204, for example, converts a magnetic field produced by a read/write means provided on the deck side for read/write of a signal from or to the cartridge memory 208 to supply driving power to the cartridge memory 208, transmits a signal representing information stored in the IC section 206 to the read/write means on the deck side, receives a signal transmitted from the read/write means on the deck side, and supplies the received signal to the IC section 206.

In the illustrated example, the cartridge memory 208 has the IC section 206 and the antenna 204 combined integrally with each other and is mounted in the magnetic tape cartridge 200 close to a bottom surface 212 and a back surface 214 of the magnetic tape cartridge 200 at an angle of about 45 degrees to each of the bottom surface 212 and the back surface 214.

To mount such a cartridge memory in a recording medium cartridge such as a magnetic tape cartridge, the cartridge memory is ordinarily placed in a suitable cartridge memory accommodation space according to the internal construction of the cartridge by considering the assembly facility and productivity as needed.

Such a cartridge, however, has various metallic parts, e.g., screws for fastening the upper and lower halves to assemble the cartridge, and a spring for urging a hub brake release means (a brake spring).

As described above, a noncontact-type memory such as a cartridge memory obtains driving power and transmits and receives signals through an electromagnetic induction system, an electrostatic system or the like. Therefore, if a metallic component exists in the vicinity of the antenna of the noncontact-type memory, there is a possibility of failure to suitably supply electric power, which may result in a malfunction, or a possibility of transmitting and receiving of signals being badly influenced to cause incorrect transmitting and receiving of signals.

This problem may be solved by replacing all the metallic parts used in the cartridge with resin parts. This method, however, requires high-priced parts which may be low in mechanical and thermal strength, and entails considerable difficulty in obtaining the desired recording medium cartridge in terms of each of the quality and the manufacturing cost of the cartridge.

In the conventional art, there is a second problem that, to attach a cartridge memory to a magnetic tape cassette or a magnetic tape cartridge, the structure, size, etc., of which are specified in detail as described above, for the purpose of indicating the contents of information recorded on a magnetic tape accommodated in the cartridge, it is necessary to design an attachment structure with great care so as to avoid interference with running of the magnetic tape and not to cause a reduction in structural rigidity.

There is a third problem of the conventional art described below. There may be the recording medium cartridge for data recording, such as a magnetic tape cartridge, may be small in overall size. Because of such a restricted size and the specific structure of the recording medium cartridge, the spaces for a magnetic tape winding, a mechanism for preventing an inadvertent erasing operation and a mode detection mechanism generally occupy the entire internal space of the cartridge. Further, in recent magnetic tape cartridges, the diameter of the magnetic winding is increased for the purpose of increasing the recording capacity, and it is more difficult to incorporate a cartridge memory (memory IC) in such cartridges on the basis of the conventional incorporation method.

In the conventional art, there is a fourth problem that, in a case where a cartridge memory is mounted in a recording medium cartridge such as a magnetic tape cartridge by an arrangement system such as that in the illustrated example described above, there is a possibility of a hindrance to transmitting and receiving of data between the cartridge memory and a recording and reproduction apparatus (deck) for a reason relating to the recording medium cartridge on the mount side when the recording medium cartridge is set in the recording and reproduction apparatus.

There is a fifth problem of the conventional art described below. After a cartridge memory has been incorporated in a magnetic tape cartridge in the manner described above with respect to the illustrated example, it may be found to be defective by an operation check. In such a case, there is a need to change the cartridge memory by disassembling the external casing of the assembled magnetic tape cartridge. Therefore it is necessary to make an operation check of the cartridge memory before the cartridge memory is mounted.

Also, since cartridge memories are high-priced, they may be reused if the magnetic tape cartridge in which the cartridge memory becomes unusable for some reason. Reuse of cartridge memories requires troublesome operations of disassembling magnetic tape cartridges to take out the cartridge memories.

A sixth problem of the conventional art relates to a method for mounting a cartridge memory in a recording medium cartridge other than that described above with reference to FIG. 31. For example, a method of attaching a cartridge memory as a label to a recording medium cartridge in such a manner that the cartridge memory is set in a back label on the recording medium cartridge. More specifically, for example, a method for attachment of a cartridge memory to a video tape cassette is disclosed in Japanese Patent Laid-open Publication No. 10-177776.

In the art disclosed in this publication, a cartridge memory such as that described above is provided in a back label to be attached to a back surface of a video tape cassette. That is, in this back label (cartridge label), an IC chip (IC memory) constituting an IC section of the cartridge memory is placed on a cushion layer and a protective sheet is provided over the IC chip, thus realizing a cartridge memory attachment method facilitating handling of the cartridge memory.

The cassette label in the above-described conventional art entails a drawback in that, when a user writes on the cassette label information on the contents of a recording in the video tape cassette, the user may damage the IC chip (IC memory) in the cartridge memory in the cartridge label by, for example, applying a high pressure to the point of a ball-point pen.

The art disclosed in Japanese Patent Laid-open Publication No. 10-177776 includes a method for avoiding damage to the IC chip in such a situation by providing, on a region (IC section) in which the IC chip (IC memory: an integrated circuit including a memory section and a signal processing section) in the cartridge memory accommodated in the cartridge label is placed, a logo description area where a predetermined set of letters or figure is printed in advance to inhibit writing of letters, a figure, etc., on this region substantially.

The sixth problem of the conventional art resides in that, although the cartridge label in the art disclosed in the above-described publication was designed by considering protection of the IC chip in the cartridge memory, it is, in fact, also important to consider prevention of damage (causing disconnection or the like) to the antenna conductor (coil) in the antenna section, and the above-described kind of cartridge label has not been designed by considering protection of the antenna section for preventing such damage.

SUMMARY OF THE INVENTION

In view of the above-described problems of the conventional art, a first object of the present invention is to provide a recording medium cartridge such as a magnetic tape cartridge on which is mounted a noncontact-type memory (cartridge memory) having an information storage and signal processing section (IC section) constituted by an IC memory or the like and an antenna section for transmitting and receiving signals, the recording medium cartridge being free from occurrence of malfunction of the noncontact-type memory and an incorrect result of transmitting and receiving of signals, the recording medium cartridge being capable of correctly transmitting and receiving signals to and from the noncontact-type memory with stability.

In view of the above-described circumstances, a second object of the present invention is to provide a recording medium cartridge designed as a magnetic tape cassette in which a noncontact-type memory can be mounted at such a position as to avoid interference with running of a magnetic tape and not to the structural rigidity of the recording medium cartridge.

In view of the above-described problems of the conventional art, a third object of the present invention is to provide a recording medium cartridge designed as a magnetic tape cartridge so that a noncontact-type memory (IC memory) can easily be incorporated even in a small cartridge case.

In view of the above-described circumstances, a fourth object of the present invention is to provide a recording medium cartridge free from the above-described problems of the conventional art, that is, when the recording medium cartridge is loaded in a recording and reproduction apparatus (deck), there is no possibility of a hindrance to transmitting and receiving of data between a noncontact-type memory mounted in the recording medium cartridge and the recording and reproduction apparatus (deck).

In view of the above-described problems of the conventional art, a fifth object of the present invention is to provide a recording medium cartridge designed as a magnetic type cartridge or the like so that a noncontact-type memory can easily be mounted in the recording medium cartridge, and so that information can easily be written to or read out from the noncontact-type memory.

In view of the above-described circumstances, a sixth object of the present invention is to provide a cartridge label used by being attached to a recording medium cartridge and designed by considering prevention of damage to a antenna section of a noncontact type memory as well as protection of an IC chip in an IC section of the memory.

In order to attain the first object described above, the first mode of the present invention provides a recording medium cartridge comprising a cartridge case containing a recording medium; and a noncontact-type memory having an IC section for storing information and performing signal processing, and an antenna section for transmitting and receiving signals, wherein the antenna section of the noncontact-type memory is placed in a region furtherest from metallic parts.

In order to attain the second object described above, the second mode of the present invention provides a recording medium cartridge comprising a noncontact-type memory having an IC section for storing information and performing signal processing, and an antenna section for performing data transmission by transmitting and receiving signals, data being read from and written to the noncontact type memory in a noncontact manner; and an accommodation portion which accommodates the noncontact-type memory at least partially, and which includes a first portion corresponding to the noncontact-type memory and a second portion in the vicinity of the noncontact-type memory; wherein the accommodation portion is recessed one step relative to a surrounding portion.

Preferably, the recording medium cartridge is a magnetic tape cartridge.

Preferably, in the accommodation portion recessed one step relative to the surrounding portion to accommodate the noncontact-type memory, the first portion on which the noncontact-type memory is fixed and positioned is recessed further one step relative to the second portion, and a position of the noncontact-type memory is limited in front-rear and left-right directions by the first portion recessed further one step.

It is preferable that the recording medium cartridge further comprises a sheet position limit pin with a reinforcement rib, wherein the reinforcement rib of the sheet position limit pin has an extension portion being partially extending into the accommodation portion which is recessed one step relative to the surrounding portion and which accommodates the noncontact-type memory, and wherein the extension portion limits a position of the non noncontact-type memory in front-rear direction.

Preferably, the extension portion of the reinforcement rib of the sheet position limit pin at a side facing the noncontact-type memory is shaped so as to facilitate insertion of the noncontact-type memory.

It is also preferable that the recording medium cartridge further comprises a rib for limiting a position of a magnetic tape winding wound around a hub when the magnetic tape winding plays, the rib being formed in the vicinity of the portion for accommodating the noncontact-type memory, the rib having a certain curvature, the rib having at least a length enough to prevent the magnetic tape winding from contacting the noncontact-type memory when the magnetic tape winding plays.

Preferably, the rib for limiting the position of the magnetic tape winding when the magnetic tape winding plays is formed so as to limit a position of the noncontact-type memory at least in a lengthwise direction of the magnetic tape cartridge.

Preferably, the rib for limiting the position of the magnetic tape winding when the magnetic tape winding plays has drafts used at the time of molding, and the drafts are set so that one draft on a side of the noncontact-type memory is larger than another draft on a side of the magnetic tape winding.

Preferably, a thick portion which is a non-thickness reducing portion provided at a foot of a thickness-reducing portion of a portion formed at a rear side of the magnetic tape cartridge and corresponding to a magnetic tape winding is extended to the recessed accommodation portion in the vicinity of a position at which the noncontact-type memory is accommodated, and the extended portion of the thick portion limits the position of the noncontact-type memory in a lengthwise direction of the magnetic tape cartridge.

Preferably, in the accommodation portion recessed one step relative to the surrounding portion to accommodate the noncontact-type memory, a rib having a length substantially equal to a size of the noncontact-type memory in a lengthwise direction is provided along a lengthwise direction of the magnetic tape cartridge.

In order to attain the third object described above, the third mode of the present invention provides a recording medium cartridge consisting of a magnetic tape cartridge comprising a cartridge case constituted by an upper case member and a lower case member, a magnetic tape winding being accommodated in the cartridge case; and a noncontact-type memory for recording information on-contents of information recorded on a magnetic tape and information on the magnetic tape cartridge, wherein the noncontact-type memory is curved so as to conform to a circumferential configuration of the magnetic tape winding accommodated in the cartridge case when a diameter of the magnetic tape winding is maximized, the noncontact-type memory being mounted in the cartridge case so that the curved shape of the noncontact-type memory forms a portion of an inner wall of a reel area for accommodating the magnetic tape winding in the cartridge case.

In order to attain the fourth object described above, the fourth mode of the present invention provides a recording medium cartridge comprising a cartridge case in which a recording medium is contained; and a noncontact-type memory for recording information on recording medium cartridge and information on contents of information recorded on the recording medium, wherein the noncontact-type memory is mounted in such a position as to be exposed when the recording medium cartridge is loaded into a drive.

The fourth mode of the present invention provides a recording medium cartridge comprising a cartridge case in which a recording medium is contained; and a noncontact-type memory for recording information on recording medium cartridge and information on contents of information recorded on the recording medium, wherein the non-contact-type memory is mounted in such a position as to be exposed when a cover member of the recording medium cartridge is opened.

Preferably, the recording medium cartridge is a cartridge having the cartridge case rotatably accommodating a single reel around which a magnetic tape is wound, a cartridge having the cartridge case rotatably accommodating a single magnetic disk, and a cartridge having the cartridge case accommodating a pair of winding hubs around which the magnetic tape is wound.

The recording medium cartridge may be a two-reel type magnetic tape cartridge specified in accordance with JISX6141 with respect to the structure, size, and so on, and accommodating a pair of winding hubs around which a magnetic tape is wound, and the noncontact-type memory is preferably attached to a back surface of the cover member.

The recording medium cartridge may be a two-reel type magnetic tape cartridge specified in accordance with JISX6141 with respect to the structure, size, and so on, and accommodating a pair of winding hubs around which a magnetic tape is wound, the cartridge having an opening, and the noncontact-type memory is preferably attached to a back surface of the cover member.

The fourth mode of the present invention provides a recording medium cartridge of a two-reel type accommodating a pair of winding hubs around which a magnetic tape is wound, for example, a magnetic tape cartridge being specified in accordance with JISX6141 with respect to the structure, size, and so on, and comprising an opening; and a noncontact-type memory for recording information on recording medium cartridge and information on contents of information recorded on the magnetic tape accommodated in the recording medium cartridge, wherein the noncontact-type memory is mounted in such a position as to face the opening.

The fourth mode of the present invention provides a recording medium cartridge of a two-reel type accommodating a pair of winding hubs around which a magnetic tape is wound, for example, a magnetic tape cartridge being specified in accordance with JISX6141 with respect to the structure, size, and so on, and comprising an opening; and a noncontact-type memory for recording information on recording medium cartridge and information on contents of information recorded on the magnetic tape accommodated in the recording medium cartridge, wherein the noncontact-type memory is mounted on an inner surface of the recording medium cartridge at such a position as to contact the magnetic tape.

Preferably, a peripheral portion of a position at which the noncontact-type memory is mounted is recessed.

In order to attain the fifth object described above, the fifth mode of the present invention provides a recording medium cartridge comprising a cartridge case constituted of an upper case member and a lower case member, a recording medium being accommodated in the cartridge case; a noncontact-type memory for recording information on contents of information recorded on the recording medium and information on the recording medium cartridge, wherein the noncontact-type memory is mounted in a recess formed in an outer surface of the cartridge case.

Preferably, a recess is formed in an outer surface portion of the cartridge case around a screw hole into which a screw for fastening the upper and lower case members is inserted, and wherein the noncontact-type memory is mounted in the recess with a fastening screw at the time of fastening the upper and lower case members.

Preferably, a recess is formed in an outer surface portion of the cartridge case in the vicinity of a portion which serves as a reference surface when the recording medium cartridge is loaded in a recording and reproducing apparatus, and wherein the noncontact-type memory is mounted in the recess.

Preferably, if the recording medium cartridge has a lid for protecting a front-side opening of the cartridge case, a recess is formed in a side surface of the lid at one end in a lengthwise direction of the lid, and the noncontact-type memory is mounted in the recess.

Preferably, if the recording medium cartridge has slider for protecting a bottom-side opening of the cartridge case, a cut is formed in a rear end portion of the slider; a recess is formed in an outer surface portion of the cartridge case coinciding with the cut of the slider when the slider is at a position at which the slider uncovers the bottom-side opening of the cartridge case; and the noncontact-type memory is mounted in the recess.

In order to attain the sixth object described above, the sixth mode of the present invention provides a cartridge label capable of being attached to a recording medium cartridge having a cartridge case accommodating a recording medium, containing a noncontact-type memory wherein the noncontact-type memory has an IC section for performing information storage and signal processing for recording information on the recording medium cartridge and information on a recording medium accommodated in the recording medium cartridge, and an antenna section for transmitting and receiving signals, wherein at least an antenna section protective indication for indicating an information writing area other than the area on an antenna coil of the antenna section is provided on the cartridge label.

Preferably, the antenna section protective indication is provided by one of printing or attaching a seal which is prepared in advance according to a size of the antenna section is performed to provide.

Preferably, the antenna section protective indication designates an area inside a looped antenna constituting the antenna section as an information writing area.

Preferably, the antenna section protective indication designates an area inside a looped antenna constituting the antenna section as an information writing area, and is design-integral.

Preferably, the noncontact-type memory is reusable.

Preferably, the cartridge label is formed so as to be capable of being inserted into and drawn out from slide grooves provided in the recording medium cartridge, and wherein, when the recording medium cartridge becomes unnecessary, the cartridge label is drawn out from the slide grooves of the recording medium cartridge and is inserted into and held on another recording medium cartridge.

DESCRIPTION OF THE PREFERRED EMBODIMENTS

Recording medium cartridges and a cartridge label in preferred embodiments of the present invention will be described in detail with reference to the accompanying drawings.

Figure 1:
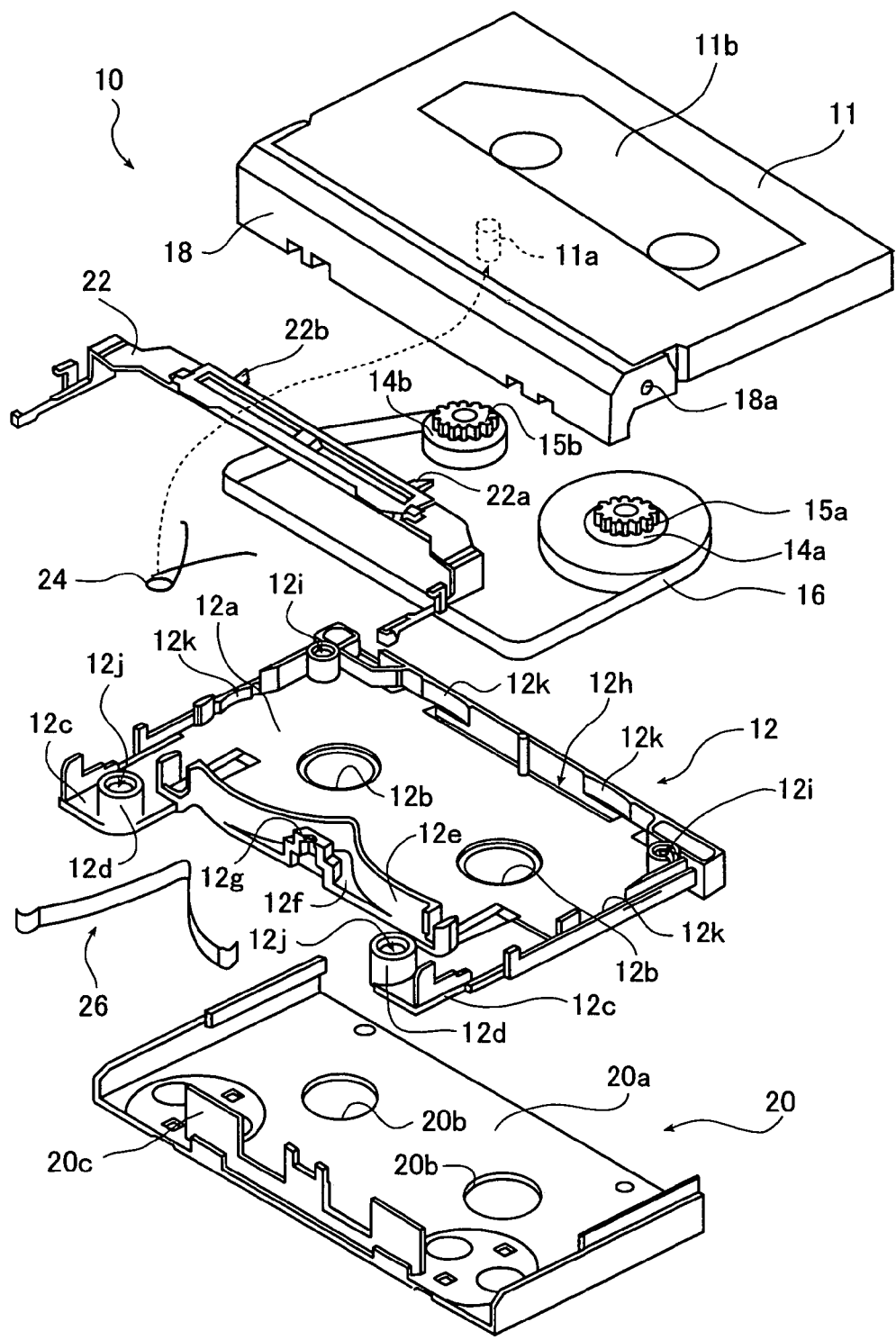
FIG. 1 is a schematic exploded perspective view of a magnetic tape cartridge which is an example of application of a recording medium cartridge in accordance with the present invention.
Figure 2:
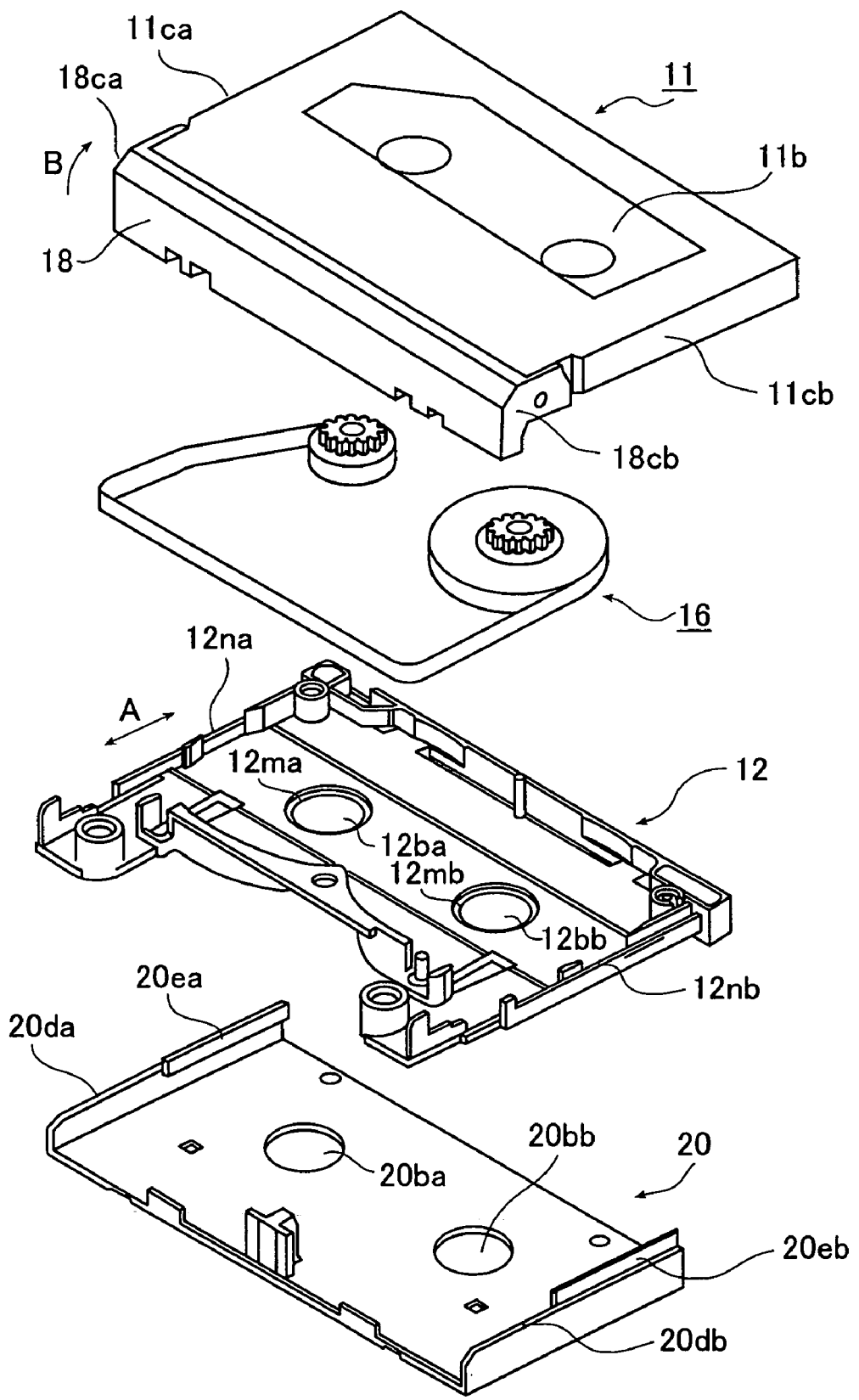
FIG. 2 is a schematic exploded perspective view of essential portions of a magnetic tape cartridge which is another example of application of the recording medium cartridge in accordance with the present invention.
Figure 3:
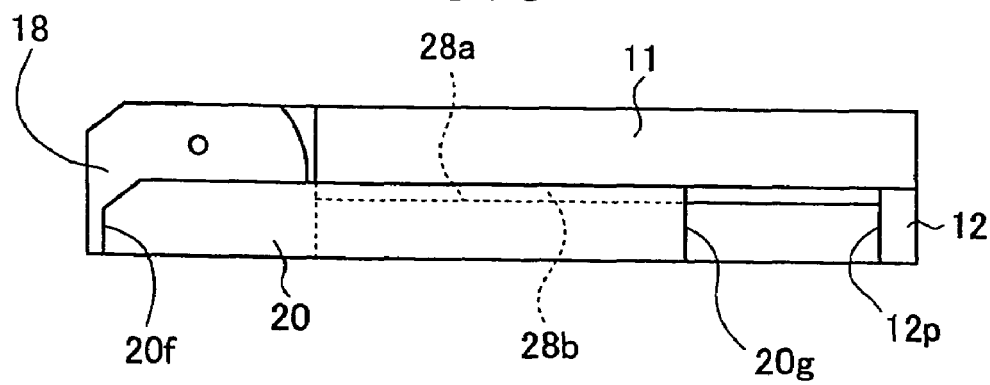
FIG. 3 is a schematic side view of the magnetic tape cartridge shown in FIG. 2, showing an closed state when the cartridge is not used.

A magnetic tape cartridge which typifies recording medium cartridge in accordance with the present invention will be outlined with respect to the configuration thereof with reference to FIGS. 1 through 3.

FIG. 1 is an exploded perspective view of a magnetic tape cartridge which is an embodiment of application of a recording medium cartridge in accordance with the present invention.

This magnetic tape cartridge (hereinafter referred to simply as "cartridge") 10 has a basic configuration corresponding to that of well-known magnetic tape cartridges (also called magnetic tape cassettes) specified in accordance with JISX6127 (1992), JISX6129 (1993), JISX6130 (1996), JISX6141 (1993), ECMA-288, etc., with respect to the structure, size, and so on. The magnetic tape cartridge 10 is constituted mostly of an upper half (upper case member) 11, a lower half (lower case member) 12, a supply-side winding hub 14a and a take-up-side winding hub 14b rotatably supported axially on each of the two halves 11 and 12 at predetermined positions in a casing (cartridge case) formed by the two halves 11 and 12, and a magnetic tape 16 provided as a recording medium, accommodated between the two halves 11 and 12 and wound around each of the two winding hubs 14a and 14b.

This cartridge 10 has a front lid 18 at the front side of the upper half 11 (through which the tape is fed into a deck). The front lid 18 covers and protects the magnetic tape 16 when cartridge 10 is not used. The front lid 18 is attached to the upper half 11 so as to be rotatable on supporting axes 18a. The cartridge 10 also has a slider 20 for improving the closure of the cartridge 10 by closing holes or the like formed in the lower half 12. The slider 20 is engaged with the lower half 12 so as to be slidable in a direction toward the front or rear side (hereinafter referred to as "front-rear direction", a direction perpendicular to the front-rear direction hereinafter referred to as left-right (lateral) direction) on a surface of the lower half 12 placed below the bottom of the lower half 12 as seen in the figure (hereinafter referred to as "lower surface"). That is, the slider 20 for closing opening sections in a lower case portion to improve the closure is attached to an outer lower surface of the lower half 12 so as to be slidable in the front-rear direction.

In the cartridge 10, a braking member 22 is attached to the upper half 11 to prevent the magnetic tape 16 wound around the winding hubs 14a and 14b from loosening when the cartridge 10 is not used. The braking member 22 has two braking projections 22a and 22b. The baking projection 22a is engaged with a gear 15a provided on the top of the winding hub 14a, and the braking projection 22b, with a gear 15b provided on the top of the winding hub 14b. The two winding hubs 14a and 14b are thereby stopped (inhibited) from rotating to prevent loosening of the magnetic tape 16.

The braking member 22 is urged toward the rear side by a brake spring 24 mounted on the upper half 11 by being engaged with a projection 11a. The braking member 22 is thereby moved to and maintained at a position at which the braking projections 22a and 22b engage with the gears 15a and 15b when the cartridge is not used. When the cartridge is used, the braking member 22 is moved toward the front side with the movement of the front lid 18 to disengage the braking projections 22a and 22b from the gears 14a and 14b, thereby enabling the winding hubs 14a and 14b to rotate.

A rectangular bottom plate portion 12a of the lower half 12 has a pair of reel shaft insertion holes 12b through which reel shafts of the deck are inserted into the cartridge case when the cartridge is used, a pair of extensions 12c extending forward from left and light ends of the bottom plate portion 12a, and a pair of screw holes 12i formed through the lower half 12 at centers of cylindrical ribs protecting upward (toward the upper half 11) in the vicinity of rear left and right corners of the lower half 12.

A pair of cylindrical ribs 12d protecting upward and capable of guiding the magnetic tape 16 are also provided on the two extensions 12c, and screw holes formed through the lower half 12 at centers of the two cylindrical ribs 12d. The space defined between the pair of left and right extensions 12c is provided to allow entrance of a tape loading device provided in the deck in which the cartridge 10 is loaded.

In the illustrated cartridge, four screws are inserted into the pair of screw holes 12i and the pair of screw holes 12j from below and are screwed into corresponding inner surface portions of the upper half 11 to fasten the cartridge case formed by combining the upper half 11 and the lower half 12.

The lower half 12 has a wall-like portion (reel area rib) 12e formed upright on the bottom surface 12a at a front side of the bottom surface 12a, i.e., a side along which the space for entrance of the tape loading device is defined (at which the magnetic tape is exposed). The reel area rib 12e is formed upright on the bottom surface 12a in such a manner that two ribs each having the shape of a portion of a cylinder are integrally combined so as to form a ridged shape. The reel area rib 12e has the function of preventing the winding hubs 14a and 14b around which the magnetic tape 16 is wound (windings of magnetic tape 16) from moving freely. The curved portions of the reel area rib 12e are formed so as to conform to the circumferential surface of each of the windings of the magnetic tape 16 wound around the winding hubs 14a and 14b when the winding is correctly positioned and when the diameter of the winding is maximized.

A column-like rib 12g is formed at a center of front portion 12f of the bottom plate 12a defined as a generally triangular area by the reel area rib 12e, the column-like rib 12g standing upright on the bottom surface 12a. A plate spring (slider spring) 26 is fitted between the column-like rib 12g and the reel area rib 12e to urge the slider 20 in the frontward direction.

The lower half 12 has in its side wall portions circular-arc recesses 12k formed so as to conform to the circumferential surface of the maximum-diameter winding of the magnetic tape 16 and to avoid interference with the winding of the magnetic tape 16. The recesses 12k and the reel area rib 12e define a reel area (inner wall surfaces defining a reel area).

A groove 12h is formed as a thickness-reducing groove in a portion of the bottom plate 12a of the lower half 12 in the vicinity of the rear side.

The slider 20 moves (slides) in the front-rear direction by sliding on the lower surface of the lower half 12 (contacting the lower surface opposite from the bottom surface 12a from below). When the slider 20 is at a front position, it closes, for dustproofing, the space for entrance of the tape loading device through the font side of the lower half 12 between the two extensions 12c and the reel insertion holes 12b by its bottom surface 20a.

When the slider 20 is at a receding position, it opens the space for entrance of the tape loading device between the two extensions 12c. Simultaneously, two holes 20b formed in the bottom plate 20a of the slider 20 are aligned with the reel shaft insertion holes 12b to enable the reel shafts of the deck to be inserted into the reel shaft insertion holes 12b.

Further, the slider 20 has a wall-like rib 20c extending upright from a portion of the bottom surface 20a in the vicinity of the front side of the bottom surface 20a. The rib 20c is provided to receive the urging force of the plate spring 26, and the plate spring 26 provided on the lower half 12 as described above contacts the rib 20c. That is, the slider 20 is urged by the plate spring 26 so as to be fixed at the front position.

The slider 20 is automatically moved to the receding position by an internal mechanism of the deck when the cartridge 10 is loaded in the deck. When the cartridge is not used, the slider 20 is moved frontward by the action of the plate spring 26 to close the space between the two extensions 12c and the reel insertion holes 12b, as described above.

The construction of the magnetic tape cartridge to which the present invention is applied will be described in more detail by explaining a magnetic tape cartridge shown in FIGS. 2 and 3 as well as the magnetic tape cartridge shown in FIG. 1. The magnetic tape cartridge shown in FIGS. 2 and 3 has the structure, size, etc., specified in accordance with the above-mentioned JISX6127 (1992) and is basically identical in structure to the magnetic tape cartridge 10 shown in FIG. 1 and have the same components as the same. Therefore the same components shown in FIGS. 1, 2 and 3 are indicated by the same reference symbols. However, some components and reference symbols are omitted for ease of description and different reference symbols are added for further distinctions.

The magnetic tape cartridge 10 shown in FIG. 2 has basically the same main components as those shown in FIG. 1, i.e., an upper half 11, and a lower half 12 connected to the upper half 12 to form a main case body, a slider 20 fitted to the lower half 12 so as to be slidable in the direction of arrow A along bottom and side surfaces of the lower half 12, and a magnetic tape 16 accommodated in the main case body.

In this magnetic tape cartridge, the upper half 11 has a tape visual check window 11b formed therein to enable the magnetic tape 16 accommodated in the main case body to be visually recognized from outside. A front lid 18 is attached to the upper half 11 at the front end of the same to protect the magnetic tape against intrusion of dust or extraneous matters or from being touched by a user's finger when the magnetic tape is handled. The front lid 18 is freely rotatably supported on shaft receiving portions provided at the front end of the upper half through its supporting shafts 18a respectively protecting inwardly from left and right side end portions 18cl and 18cr.

The front lid 18 covers the front side of the lower half 12 to protect the magnetic tape from dust or extraneous matters when the magnetic tape (cartridge) is not used. When the magnetic tape is used, the slider 20 recedes by sliding in the direction of arrow A and the left and right side end portions 18ca and 18cb rotate on the supporting shafts 18a as indicated by arrow B to open the front side of the case main body, thereby enabling the magnetic tape to be fed into a recording and reproduction apparatus.

The lower half 12 has a supply-side hub reel (drive) shaft insertion hole 12ba and a rewinding-side hub reel (drive) shaft insertion hole 12bb formed therein to allow insertion from below of tape driving members (not shown) of a recording and reproduction apparatus when recording and/or reproduction to or from the magnetic tape is performed. In the lower half 12, grooves 12ma and 12mb engageable with lower portions of a supply-side hub 14a and a rewinding-side hub 14b around which the magnetic tape is wound are formed in circumference-edge portions forming the supply-side hub reel shaft insertion hole 12ba and the rewinding-side hub reel shaft insertion hole 12bb.

The slider 20 is fitted to the lower half 12 so as to be slidable along the bottom and side surfaces of the lower half 12. The slider 20 has elongated engageable slide portions 20ea and 20eb provided on rear-end inner edges of its left and right side wall portions 20da and 20db. The engageable slide portions 20ea and 20eb are slidably fitted in slide channels 28a and 28b respectively formed between a left wall portion 11ea of the upper half 11 and a left wall portion 12na of the lower half 12 and between a right wall portion 11eb of the upper half 11 and a right wall portion 12nb of the lower half 12, as indicated by the broken line in FIG. 3 when the upper half 11 and the lower half 12 are combined to form the case main body.

When the magnetic tape (cartridge) is not used, the slider 20 engages with an engagement lock mechanism provided on the bottom surface of the lower half 12 to be retained at a position at which its front end portions 20f abut against inner end surfaces of the front lid 18, as shown in FIG. 3. At this position, the slider 20 closes the supply-side hub reel shaft insertion hole 12ba and the rewinding-side hub reel shaft insertion hole 12bb of the lower half 12 to prevent dust or extraneous matters from entering the cartridge from below through the reel insertion holes 12ba and 12bb.

When the magnetic tape is used, the engagement lock mechanism is unlocked by the magnetic tape recording and reproduction apparatus and the slider 20 slides and recedes to a position at which its rear ends 20g abut against rear end portions 12p of the lower half 12. At this time, guide holes 20ba and 20bb formed in the bottom portion of the slider 20 are aligned with the supply-side hub reel shaft insertion hole 12ba and the rewinding-side hub reel shaft insertion hole 12bb, thereby opening these insertion holes 12ba and 12bb.

The magnetic tape cartridge to which the present invention is applied is basically constructed as described above.

A recording medium cartridge a first mode of implementation of the present invention will now be described with reference to FIGS. 1 through 3 and FIGS. 4 through 6.

Figure 4:
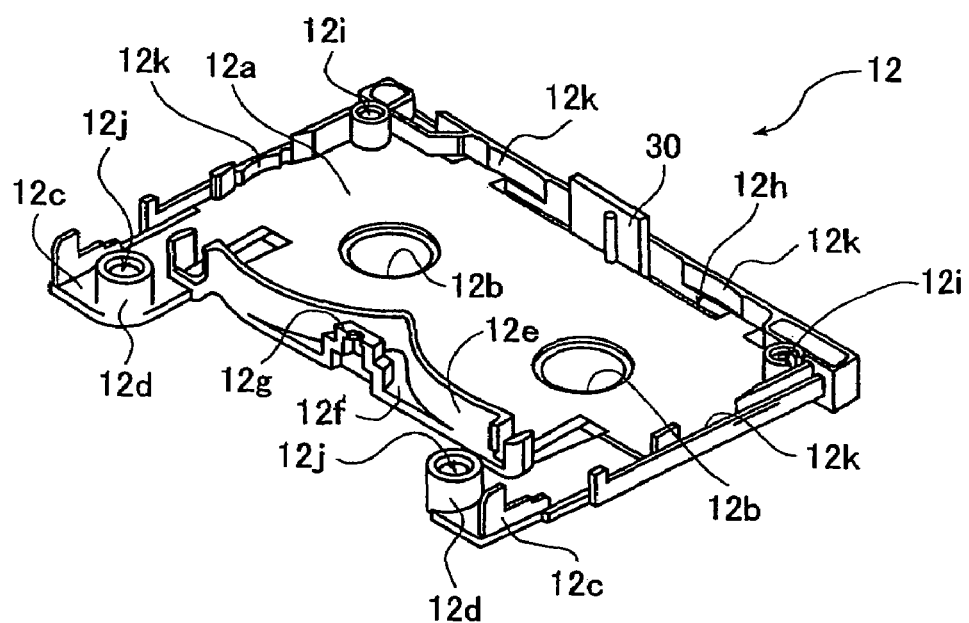
FIG. 4 is a schematic exploded perspective view of an essential portion of a recording medium cartridge in a first mode of implementation of the present invention, showing a state in which a noncontact-type memory is mounted in the lower half of the magnetic tape cartridge shown in FIG. 1.

FIG. 4 shows an example of the lower half of the magnetic tape cartridge as an essential portion of the recording medium cartridge in the first mode of implementation of the present invention. The lower half 12 shown in FIG. 4 is an example of an arrangement in which a noncontact-type memory is attached to the lower half of the magnetic tape cartridge shown in FIG. 1.

As shown in FIG. 4, a noncontact-type memory (hereinafter referred to as cartridge memory) 30 which is a component specific to the present invention is inserted in and retained by the groove 12h formed in the bottom plate portion 12a of the lower half 12 in the vicinity of the rear side.

The present invention is not limited to a particular method for retaining and positioning the cartridge memory 30. Any of well-known retaining and positioning methods may be used according to the shape of the cartridge memory 30 and the construction of the cartridge case.

The cartridge memory 30 has, as described above, an antenna section for obtaining a drive current from a transmitting and receiving means on the deck side through an electromagnetic system or an electrostatic system, and for transmitting and receiving signals (data), and an IC section (IC memory) for performing signal processing including storage and supply (read and write) of signals, and transmits or receives information on the cartridge, information on the contents of a recording in the cartridge, or the like to or from means for recording and reading signals (or means for transmitting and receiving the corresponding signals) on the deck side.

Figure 5A:
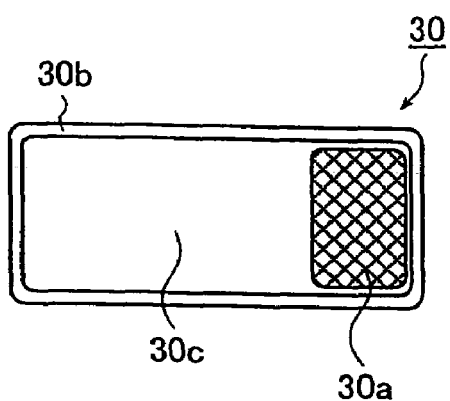
FIGS. 5A and 5B are schematic plan views of the noncontact-type memory placed in the magnetic tape cartridge shown in FIG. 4.
Figure 5B:
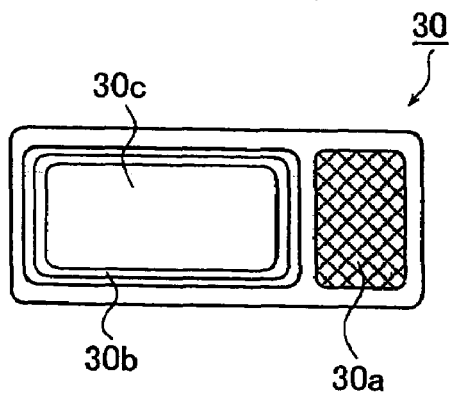

In the illustrated example of the cartridge memory 30, as shown in FIG. 5, an IC section 30a constituted by an IC memory in the form of an IC chip is formed on one end-portion of a generally rectangular substrate, and a data communication (transmitting and receiving) antenna section 30b is formed on an outer end (peripheral) portion of the substrate so as to encompass the IC section 30a. Thus, the IC section 30a and the antenna section 30b are formed integrally with each other on one substrate. Preferably, the illustrated example of the cartridge memory 30 is a member in the form of a substantially rectangular plate and the IC section 30a placed in one end portion of the cartridge memory 30 while being encompassed by the antenna section 30b is embedded in a resin. The antenna section 30b placed on a peripheral portion surrounding the portion where the IC section 30a is provided may also be embedded in a resin. Most preferably, the entire cartridge memory 30 is encapsulated in a resin.

In the present invention, the construction and shape of the cartridge memory 30 are not limited to those described above, and the cartridge memory 30 may be of any of other various constructions and shapes. For example, the IC section 30a and the antenna section 30b may be formed separately from each other. That is, the antenna section 30b may be formed separately from the substrate on which the IC section 30a is formed.

The thus constructed cartridge memory 30 itself has no power source and operates by a current induced by electromagnetic induction from a magnetic field produced by the antenna of a device provided in a recording and reproduction apparatus (deck) (not shown) and capable of reading and writing data from and to the cartridge memory 30 when the cartridge 10 accommodating the cartridge memory 30 is inserted in the recording and reproduction apparatus, thereby enabling transmitting and receiving of data between the data reader/writer of the recording and reproduction apparatus (deck) and the IC section 30a.

In the cartridge 10 in accordance with the present invention, the cartridge memory 30 is placed in a region furthest from metallic parts disposed in the cartridge (only the antenna section may be placed in such a region in the case where the antenna section and the IC section are provided separately from each other).

As described above, the cartridge memory 30 (of a noncontact type) obtains driving power and transmits and receives signals through an electromagnetic induction system, an electrostatic system or the like. Therefore, if a metallic component exists in the vicinity of the antenna section 30b of the cartridge memory 30, there is a possibility of occurrence of a malfunction or an incorrect result of transmitting and receiving of signals.

In the cartridge 10 (recording medium cartridge) in accordance with the present invention, the cartridge memory 30 (antenna section 30b) is placed in a region furthest from metallic parts disposed in the cartridge to reduce the possibility of the above-described malfunction or failure to enable stable and error-free signal transmitting and receiving between the deck and the cartridge (cartridge memory 30).

Figure 6:
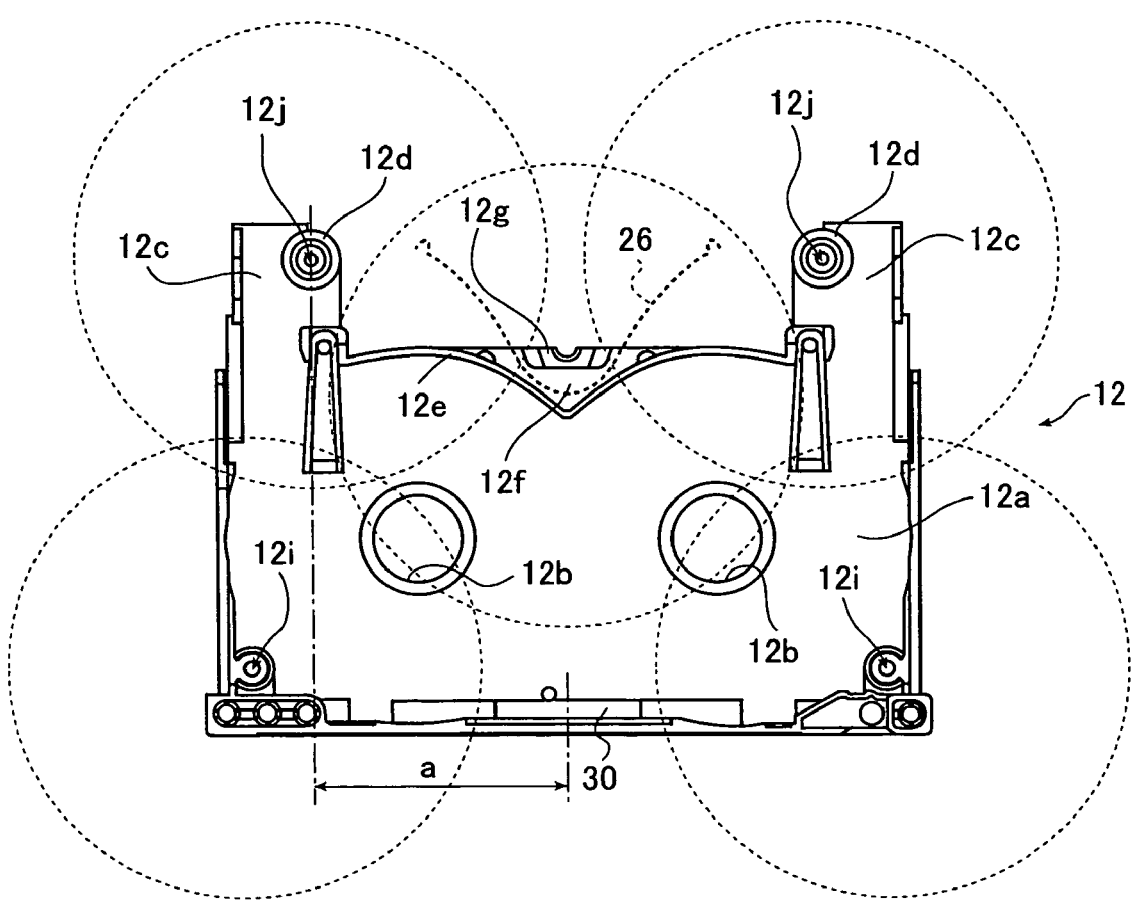
FIG. 6 is a schematic plan view of the lower half of the magnetic tape cartridge shown in FIG. 4, provided for explanation of a function of the recording medium cartridge in accordance with the present invention.

FIG. 6 is a plan view of the lower half 12 of the cartridge 10 (see FIG. 1) shown in FIG. 4.

Main metallic parts provided in the illustrated example of the cartridge 10 are the plate spring 26 (indicated by the dotted line in FIG. 6) for urging the slider 20 and the four screws for fastening the upper half 11 and the lower half 12. As described above, the plate spring 26 is fitted between the wall-like portion 12e and the column-like rib 12g of the lower half 12, and the screws are inserted into and passed through the screw holes 12j in the extensions 12c and the screw holes 12i at the rear left and right corners of the lower half 12 and screwed into the corresponding portions of the upper half 11.

The distance from each of the metallic parts in the cartridge 10 can be represented by a circle drawn about a center of the metallic part. The cartridge 10 includes metallic parts other than the above-described five metallic parts, i.e., the spring for urging the front lid 18, the brake spring 24 for urging the braking member 22 or the like. Circles drawn about centers of these parts are contained in the circles corresponding to the above-described five parts. Therefore the influence of the metallic parts other than the five main metallic parts will not be discussed in the following.

Circles of the same diameter are respectively drawn about the centers of the main metallic parts (the center of the plate spring 26 corresponds to the formed end on the ridge-like portion on the rear side). As the diameter of the circles is increased, only a rear portion at a center of the rear side in the lateral direction is left out of the circles. That is, in the cartridge 10, this region is a region furthest from the metallic parts.

Thus, as shown in FIG. 6, circles of the same diameter are drawn about the centers of the metallic parts, a region not contained in or overlapping any of the circles is selected as a region furthest from the metallic parts, and the cartridge memory 30 is placed in this region, as illustrated. As a result, the influence of the metallic parts is minimized and error-free information transmitting and receiving can be performed.

For example, in the case of a (magnetic tape) cartridge having no braking member 22 release means (winding hub brake release means) between the winding hubs 14a and 14b like the illustrated example, the above-described rear central portion is ordinarily furthest from the metallic parts and it is preferable to place the cartridge memory 30 in the furthest region.

According to the present invention, a region furthest from metallic parts may be selected, for example, as a region not contained in or overlapping any of circles of a suitable size drawn about the centers of the metallic parts, as shown in FIG. 6.

The size of circles drawn for this purpose is not particularly limited, and may be determined as desired according to the number of metallic parts, the densities of the metallic parts, the strength of a signal supplied from the deck, the sensitivity of the antenna section 30b, etc. To correctly transmit and receive signals, it is preferable to set the diameter of the circles to such a value that the circles contacts or overlap each other as viewed in the plan view of FIG. 6 at least with respect to the closest pair of metallic parts.

Alternatively, the circles about the centers of the metallic parts may be enlarged as described above to find a minimum region in which the cartridge memory 30 (the antenna section) can be placed without being contained in any of the circles in accordance with the size and shape of the cartridge memory 30, the internal construction of the cartridge, etc.

Further, the position at which the cartridge memory 30 is placed may be determined in such a manner that the circles are enlarged as described above, and a region furthest from the metallic parts is defined about a point finally contained in the circles.

At present, (magnetic tape) cartridges differing in size in at least one of horizontal directions (the above-mentioned front-rear and left-right directions) and thickness directions (perpendicular to the horizontal directions) but usable in the same deck are being developed to be put to practical use, as are the digital video cassettes and the cassettes capable of recording and reproduction in the Beta-Cam system. That is, cartridges having different cartridge case sizes but usable in the same deck are being developed.

In most cases, such cartridges use a common means provided in a deck to be positioned in horizontal directions in the deck. That is, reference portions formed in the cartridges for horizontal positioning in a deck are basically the same in shape and position regardless of the size.

If the present invention is applied to such cartridges, it is preferred that, while the above-described conditions are satisfied with respect to cartridges of at least two sizes, the cartridge memory 30 should be placed so that the position in the lateral (left-right) direction is substantially constant with respect to horizontal positioning reference portions in the cartridges.

For example, if a horizontal direction reference portion corresponds to one of the bottom screw holes 12j of the lower half 12 in the illustrated example of the cartridge 10, the cartridge memory 30 is placed so that the distance a between a line drawn from the reference portion in the front-rear direction and the center of the cartridge memory 30 in the lateral direction is substantially constant with respect to different cartridge sizes.

That is, in cartridges differing in size, the cartridge memories 30 are placed so that the positions of the cartridge memories 30 in a deck in the lateral direction are substantially the same.

This arrangement makes it possible to eliminate the need for moving recording and reading means (signal transmitting and receiving means) placed in a deck when the cartridge is loaded in the deck to perform transmitting and receiving of information between the cartridge memory 30 and the recording and reading means in the deck, thereby preventing a reduction in signal transmitting/receiving accuracy, occurrence of a malfunction and an increase in deck manufacturing cost due to the need for this movement to enable suitable transmitting and receiving of information between the cartridge (cartridge memory 30) and the deck.

In this mode of implementation, it is not always necessary to equalize, in the front-rear and vertical (thickness) directions, the positions of the cartridge memories 30 in cartridges differing in size.

As described above, the cartridge memory 30 provided in the cartridge of the present invention transmits and receives signals in a noncontact manner. Ordinarily, electric waves or the like for communication are emitted toward an object of transmitting and receiving and can be received in a certain effective range in the direction in which they are emitted. Therefore a signal transmitted in this manner to the cartridge memory 30 can reach the cartridge memory 30 with sufficient reliability even if the position of the cartridge memory 30 in a deck varies in the front-rear direction. Also, in ordinary decks, the position of cartridge memory 30 does not vary largely in the vertical direction while the cartridge size varies.

Thus, in the case of cartridges differing in size but usable in one deck, the position of the cartridge memory 30 (antenna section) is ordinarily within the detection range of the recording and reading means of the deck provided that the above-described position in the lateral direction is substantially constant.

The recording medium cartridge in the first mode of implementation of the present invention, typified by a magnetic tape cartridge, has been described in detail. Needless to say, the present invention is not limited to the above-described example of the cartridge and various improvements or changes therein may be achieved without departing from the scope of the invention.

For example, while the above-described recording medium cartridge has the memory held in the lower half, it is not always necessarily to hold the memory at the above-described position in the present invention. If the condition that the memory is located in a region furthest from metallic parts is satisfied, the memory (antenna section) may be held outside the cartridge case, on a member other than the lower half, e.g., the upper half or the front lid, or a plurality of memories may be held on a plurality of members.

The present invention is not limited to the magnetic tape cartridge described above as an example of the recording medium cartridge in accordance with the present invention, in which a pair of winding hubs around which a magnetic tape is wound are accommodated in the cartridge. The present invention can also be applied advantageously to a one-reel type magnetic tape cartridge and to recording medium cartridges containing recording mediums such as magnetic disks and optical recording mediums.

In the first mode of implementation of the present invention, as described above in detail, the recording medium cartridge incorporating a noncontact-type memory having an information storage and signal processing section constituted by an IC memory or the like and an antenna section for transmitting and receiving signals is free from occurrence of a malfunction of the noncontact-type memory or an incorrect result of transmitting and receiving of signals, and the recording medium cartridge (noncontact-type memory) is capable of correctly transmitting and receiving signals to and from a deck with stability.

A recording medium cartridge in a second mode of implementation of the present invention will next be described with reference to FIGS. 1 through 3, FIG. 5, and FIGS. 7 through 15B.

An embodiment of the present invention based on the arrangement shown in FIGS. 1 through 3 and also having the structure, size, etc., specified in accordance with the above-mentioned JISX6127 (1992) will be described as a typical example of the recording medium cartridge in the second mode of implementation of the present invention. Needless to say, the present invention is not limited to this embodiment and can be widely applied to other magnetic tape cartridges of similar constructions.

Figure 7:
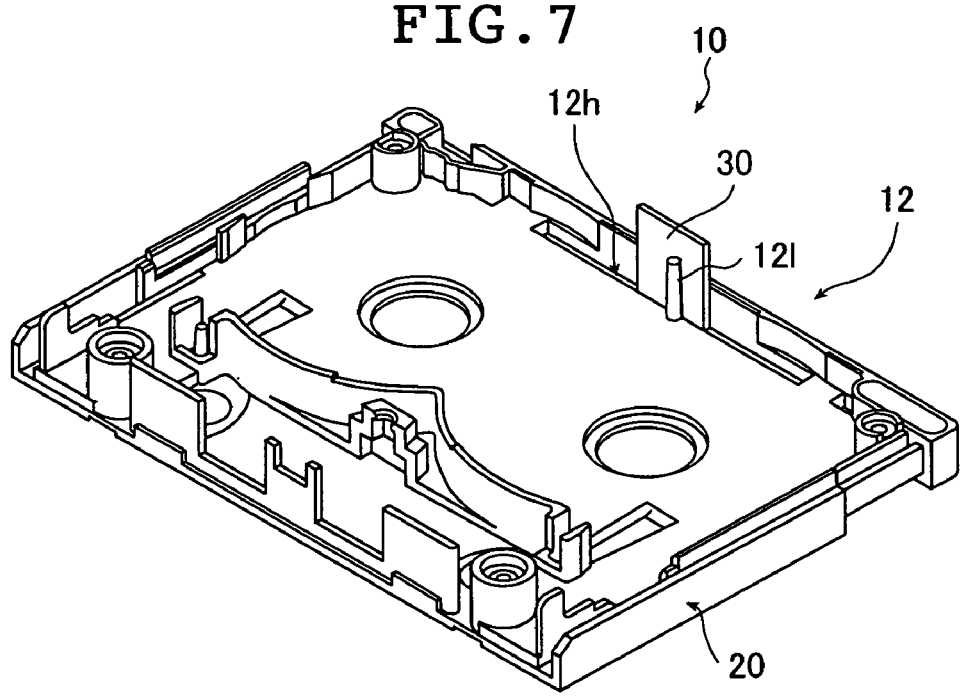
FIG. 7 is a perspective view of an essential portion of a recording medium cartridge in a second mode of implementation in one embodiment of the present invention, showing a state in which a noncontact-type memory is mounted in the lower half of the magnetic tape cartridge (cassette) shown in FIG. 1.
Figure 8:
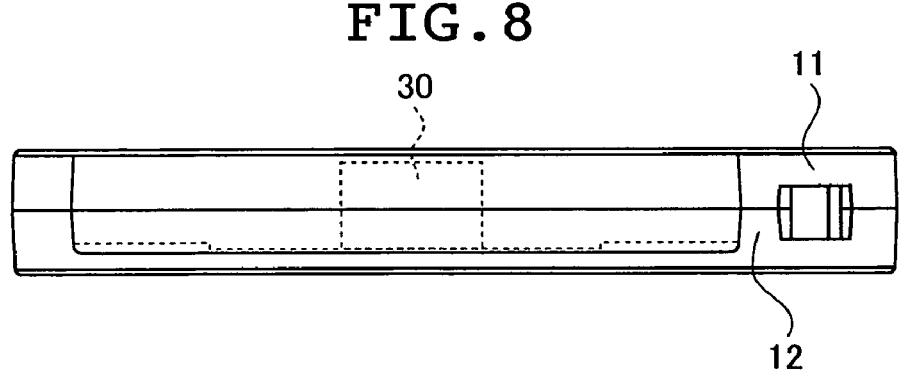
FIG. 8 is a rear side view of the lower half of the magnetic tape cartridge shown in FIG. 7.

FIG. 7 is a perspective view of the lower half of a magnetic tape cartridge which represents an embodiment of the recording medium cartridge in the second mode of implementation of the present invention, showing a state in which a cartridge memory corresponding to the above-described noncontact-type memory is mounted in the lower half. FIG. 8 is a rear side view of the cartridge.

In the magnetic tape cartridge (hereinafter referred to simply as "cartridge") 10 shown in FIG. 7, the above-described cartridge memory 30 (see FIG. 5) is set by being fitted into the groove (thickness-reducing groove) 12h close to the rear side of the lower half 12. In this setting, the cartridge memory 30 may be fixed by using a well-known means such as an adhesive or adhesive tape (double-faced tape).

A position limit pin 121 for positioning a magnetic tape protective sheet stands upright at a center of the above-described thickness-reducing groove 12h, and a supporting rib 32 for preventing deformation of the position limit pin 121 is formed in the thickness-reducing grove 12h on the rear side of the position limit pin 121. It is therefore preferred that that a portion of the supporting rib 32 corresponding to the thickness of the cartridge memory 30 should be cut and removed, as shown in FIG. 9.

Figure 9:
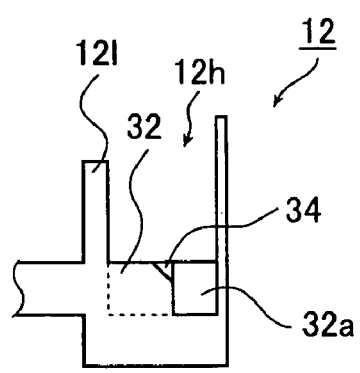
FIG. 9 is a cross-sectional view of an essential portion of a magnetic tape cartridge corresponding to a recording medium cartridge in another embodiment of the present invention, taken along a vertical plane perpendicular to the lengthwise direction.

FIG. 9 is a cross-sectional view of an essential portion of the lower half 12 along a vertical plane perpendicular to the lengthwise direction of the cartridge through the supporting rib 32. In FIG. 9, a portion (indicated by 32a) of the supporting rib 32 provided in the thickness-reducing groove 12h is shown as the portion cut and removed.

If a corner portion of the supporting rib 32 on the cartridge memory 30 side is chamfered (as indicated at 34), an effect of guiding the cartridge memory 30 when the cartridge memory 30 is set is produced.

Figure 10:
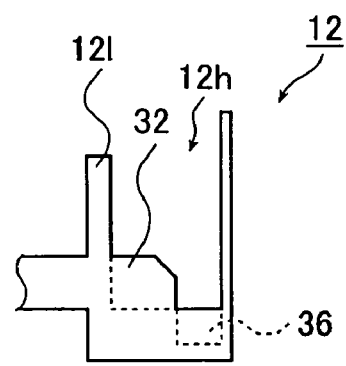
FIG. 10 is a cross-sectional view of an essential portion of a magnetic tape cartridge in still another embodiment of the present invention, taken along a vertical plane perpendicular to the lengthwise direction.

FIG. 10 shows mounting of the cartridge memory 30 in the lower half 12 in another embodiment of the present invention. FIG. 10 is a cross-sectional view of the lower half 12 along a vertical plane intersecting the supporting rib 32 and perpendicular to the lengthwise direction of the cartridge. A portion 36 shown by a broken line in FIG. 10 represents a groove which is formed along the lengthwise direction of the cartridge so as to have a size corresponding to the thickness and length of the cartridge memory 30, and which is one step deeper than the thickness-reducing groove 12h.

This groove 36 one step deeper in the thickness-reducing groove 12h is provided to facilitate positioning of the cartridge memory 30 when the cartridge memory 30 is set in the groove 12. The groove 36 is formed according to the size of the cartridge memory 30 to be set in advance, thereby enabling the cartridge memory 30 to be easily and accurately positioned at the time of setting of the cartridge memory 30.

Figure 11:
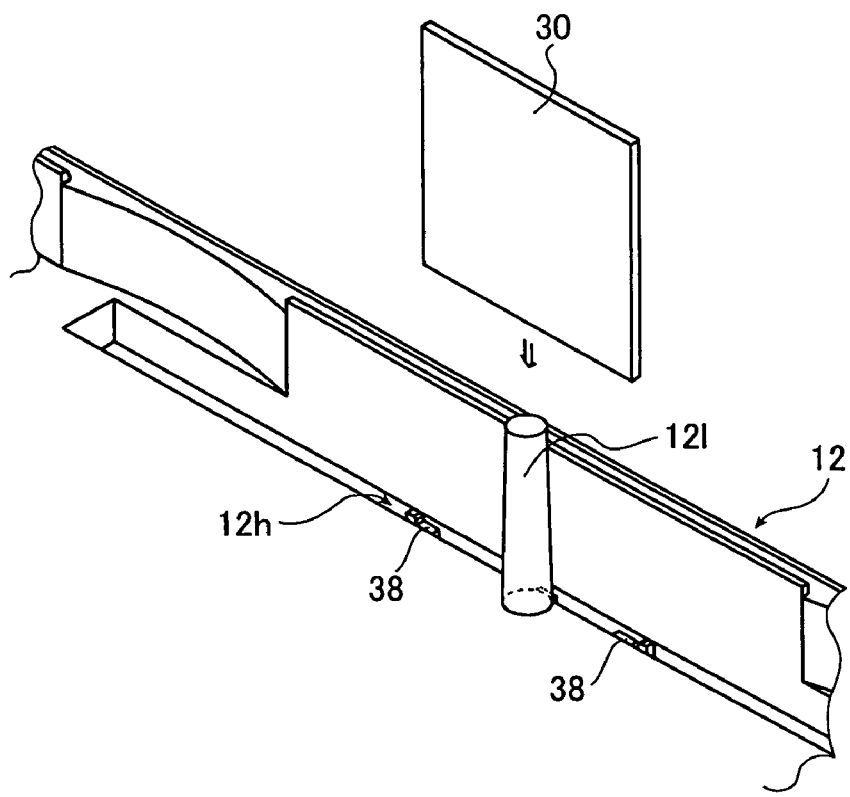
FIG. 11 is a perspective view of an essential portion of a magnetic tape cartridge in a further embodiment of the present invention.

A pair of L-shaped cartridge memory stoppers 38 such as shown in FIG. 11 may be provided in an opposed state in the thickness-reducing groove 12h instead of the groove 36 formed one step deeper than thickness-reducing groove 12h. The cartridge memory stoppers 38 stand at positions spaced apart from each other by a distance corresponding to the length of the cartridge memory 30 in the lengthwise direction of the magnetic tape cartridge. The shape of the cartridge memory stoppers 38 is not particularly specified. However, it is preferable to provide a gradient on the side facing the cartridge memory 39, which also functions as a draft described below.

Figure 12:
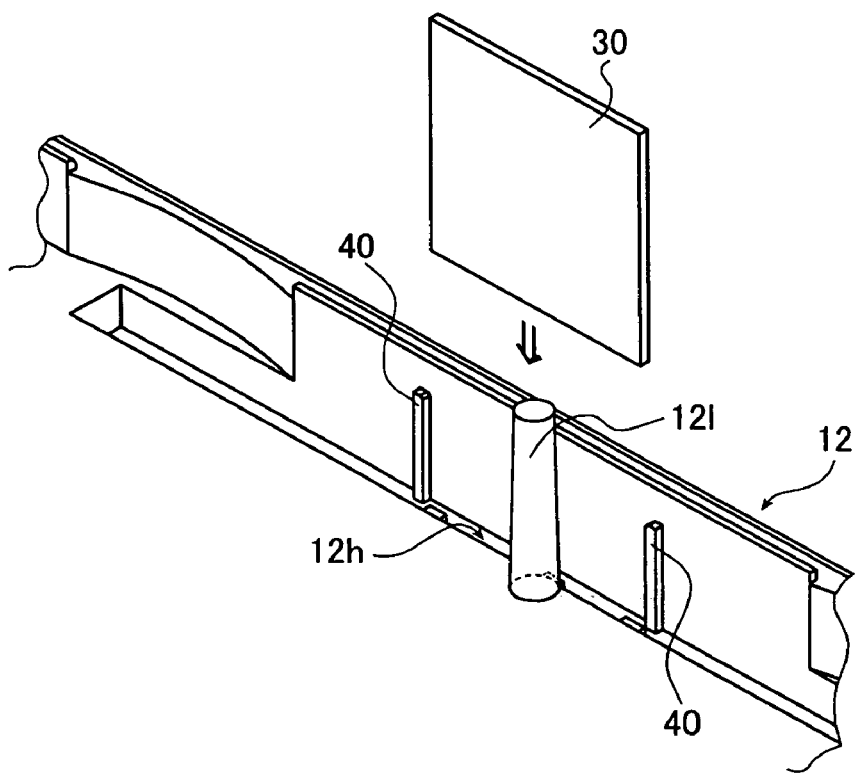
FIG. 12 is a perspective view of an essential portion of a magnetic tape cartridge in a further embodiment of the present invention.

FIG. 12 shows a modification of the above-described embodiment, in which cartridge memory stoppers 40 having such a shape as to stop or support opposite ends of the cartridge memory 30 extend from the thickness-reducing groove 12 on the rear side of the cartridge, i.e., on the inner surface of the rear side wall of the lower half 12. The cartridge memory stoppers 40 are also effective in enabling the cartridge memory 30 to be easily and accurately positioned at the time of setting of the cartridge memory 30.

As another embodiment of the present invention, a cartridge may be mentioned in which ribs for limiting the positions of the magnetic tape windings wound around the hubs (not shown) and having play are formed in the vicinity of the thickness-reducing groove 12h in which the cartridge memory 30 is set, the ribs having a certain curvature.

The magnetic tape winding position limit ribs are formed so as to have a length (along a vertical plane perpendicular to the lengthwise direction of the cartridge) long enough to prevent the magnetic tape windings from contacting the cartridge memory 30 when they play.

Further, the distance along the lengthwise direction of the cartridge between the ends of the magnetic tape winding position limit ribs facing each other is set in correspondence with the length of the cartridge memory 30 along the lengthwise direction of the cartridge. The thus-formed magnetic tape winding position limit ribs enable positioning of the cartridge memory 30 set in the thickness-reducing groove 12h along the lengthwise direction of the cartridge.

The above-described magnetic tape winding position limit ribs have drafts required at the time of molding. Preferably, these drafts are set so that the draft of the surfaces facing the cartridge memory 30 (the surfaces facing each other from the opposite sides of the cartridge memory 30) is larger than that of the surfaces on the magnetic tape winding side (the surfaces facing in the frontward direction of the cartridge).

If the drafts of the magnetic tape winding position limit ribs are set as described above, the effect of guiding the cartridge memory 30 when the cartridge memory 30 is set between the magnetic tape winding position limit ribs is improved. This setting of the drafts requires only changing restricted portions of molds for molding and can easily be made.

Figure 13:
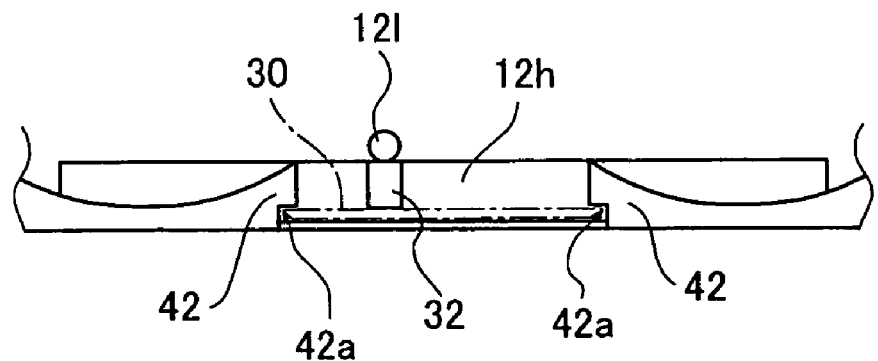
FIG. 13 is an enlarged plan view of a magnetic tape cartridge in a further embodiment of the present invention, showing a state in which a noncontact-type memory is mounted in the lower half.

FIG. 13 is an enlarged cross-sectional view of an essential portion of an example of the lower half 12 in which the above-described magnetic tape winding play position limit ribs provided on the lower half 12 are formed so as to improve the cartridge memory 30 positioning function. In this embodiment, cuts 42a are provided in the surfaces of the magnetic tape winding play position limit ribs facing the cartridge memory 30 to limit the position of the cartridge memory 30 in the front-rear and left-right directions (in both the lengthwise direction of the cartridge and the direction perpendicular to the same).

Figure 14:
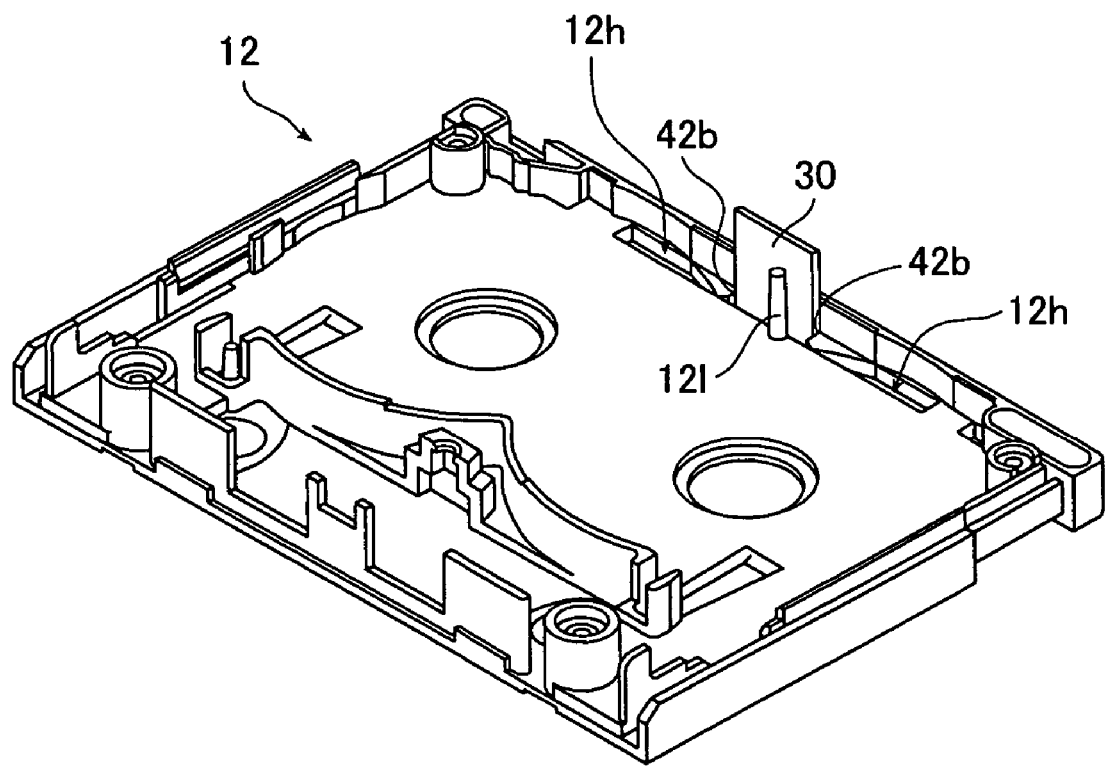
FIG. 14 is a schematic perspective view of a magnetic tape cartridge in a further embodiment of the present invention, showing a state in which a noncontact-type memory is mounted in the lower half.

FIG. 14 is a perspective view of the lower half 12 of a cartridge in a further embodiment of the present invention, showing a state where the cartridge memory 30 is mounted in the lower half 12. In this embodiment, magnetic tape winding play position limit ribs 42b corresponding to the above-described ribs for limiting the playing positions of the magnetic tape windings wound around the hubs are formed only in the thickness-reducing groove 12h, and the opposed end surfaces of the magnetic tape winding play position limit ribs 42b are used for positioning of the cartridge memory 30 along the lengthwise direction of the cartridge.

The above-described positioning means may be combined as desired to achieve effective positioning performance. For example, positioning along the lengthwise direction of the cartridge is performed by using the above-described positioning portions 56a while positioning in the direction perpendicular to the lengthwise direction of the cartridge is performed by using the supporting rib 32 cut by an amount corresponding to the thickness of the cartridge memory 30.

The magnetic tape cartridges having the structure, size, etc., specified in accordance with JISX6127 (1992) have been described for explanation of the embodiments of the present invention. However, the present invention is not limited to the described cartridges and can also be applied to magnetic tape cartridges of other types (i.e., of other constructions).

Figure 15A:
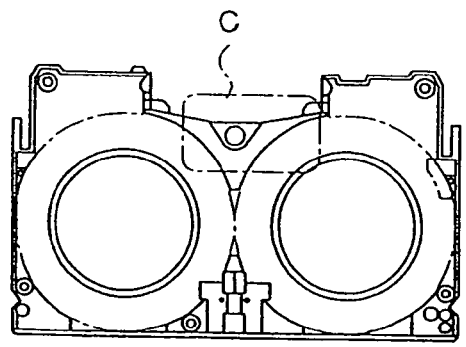
FIG. 15A is a plan view of a magnetic tape cartridge of another structure which is an example of application of the recording medium cartridge in accordance with the present invention.
Figure 15B:
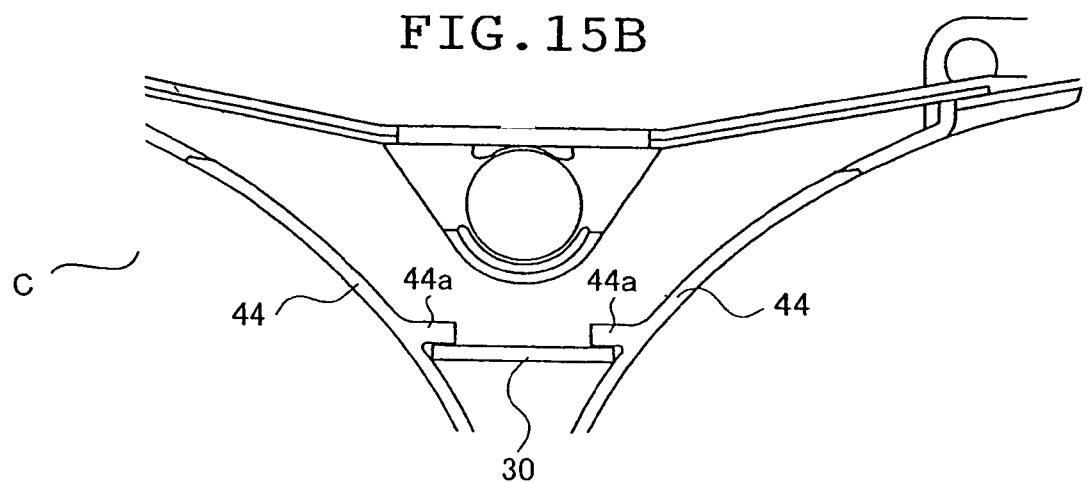
FIG. 15B is an enlarged view of showing a state where the present invention has been applied to the magnetic tape cartridge shown in FIG. 15A.

For example, FIGS. 15A and 15B show an example of application of the present invention to a digital video cassette (DVC) of the next larger size than that of the magnetic tape cartridge specified in accordance with JISX6127 (1992) with respect to the structure, size, etc. In this case, the cartridge memory 30 is set in a vacant triangular space C (shown in detail in FIG. 15B) formed by a DVC magnetic tape movement prevention rib shown in FIG. 15A.

In this example, projections 44a for retaining the cartridge memory 30 are provided between the magnetic tape movement prevention ribs 44, thus enabling the cartridge memory 30 to be set with accuracy in a simple way.

There are other various magnetic tape cartridges to which the present invention can be applied and the scope of the claims of the present invention encompasses all cases in which the present invention is applied to such magnetic tape cartridges.

Needless to say, the embodiments described above are for illustrative purpose only and the invention is not limited to the described embodiments.

According to the second mode of implementation of the present invention, as described above in detail, a magnetic tape cartridge can be provided in which a noncontact-type memory (cartridge memory) can be mounted in such a position as to avoid interference with running of the magnetic tape and not to cause a reduction in structural rigidity.

A recording medium cartridge in a third mode of implementation of the present invention will next be described with reference to FIGS. 1 through 3, FIG. 5, and FIGS. 16 and 17.

A magnetic tape cartridge containing magnetic tape windings wound around a pair of winding hubs will be described as a typical example of recording medium cartridge in the third mode of implementation. Needless to say, the present invention is not limited to this and can be widely applied to other magnetic tape cartridges.

The recording medium cartridge in the third mode of implementation of the present invention is arranged in such a manner that, in the magnetic tape cartridge shown in FIGS. 1 through 3 or in a like cartridge, a noncontact-type memory (cartridge memory), such as the one shown in FIG. 5, for recording information on the contents of a recording on a magnetic tape and information on the cartridge is curved so as to conform to the circumferential configuration of one magnetic tape winding accommodated in the cartridge case when the diameter of the tape winding is maximized, and the curved cartridge memory is mounted in the cartridge case so as to form, by its curved shape, an inner wall portion defining a reel area in the cartridge case.

A first embodiment of the recording medium cartridge in the third mode of implementation of the present invention will be described.

Figure 16:
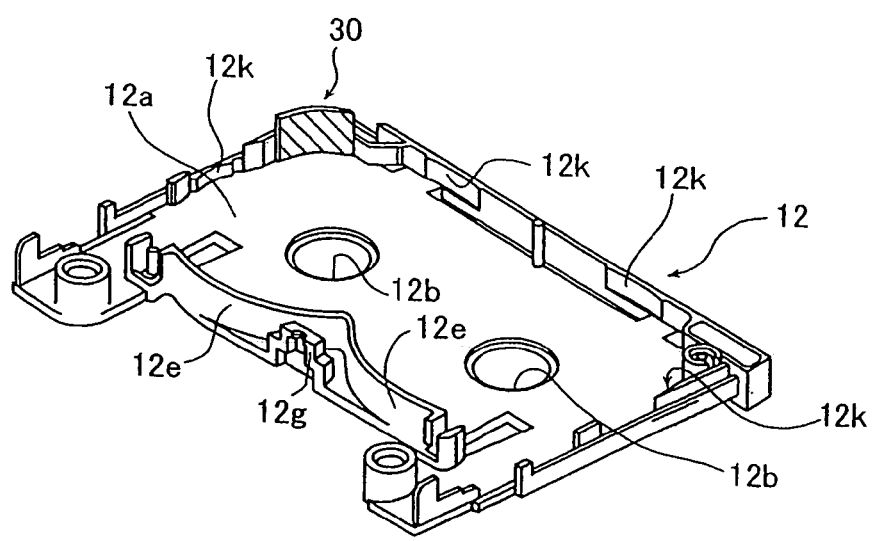
FIG. 16 is a schematic perspective view of an essential portion of a recording medium cartridge in a third mode of implementation in one embodiment of the present invention, showing a state in which a noncontact-type memory is mounted in the lower half of the magnetic tape cartridge shown in FIG. 1.

Referring to FIG. 16, in the first embodiment, a cartridge memory 30 (see FIG. 5) curved so as to conform to the circumferential (outermost) configuration of one magnetic tape winding accommodated in the cartridge case when the diameter of the tape winding is maximized is placed on one circumference along with a side wall recess 12k and a wall portion (hereinafter referred to as "reel area rib") 12e formed so as to have a ridged shape, thereby forming reel area inner wall surfaces.

The cartridge memory 30 has such a rigidity as to be able to be mounted by after being bent so as to have a predetermined curvature, as described above. The corresponding corner portion of the cartridge memory 30 is higher in strength and can be suitably used as a portion on which the cartridge memory 30 is mounted. Also, at this corner portion, a certain gap is formed between the slider 20 and the lower half 12 or the upper half 11. Therefore, if the cartridge memory 30 is mounted at this position, it can serve as a wall for dustproofing.

The cartridge memory 30 may be mounted at the other rear corner of the lower half 12 as well as at the position indicated in FIG. 16. If the cartridge memory 30 is mounted in a corner portion of the cartridge case in the above-described manner, information stored in cartridge memory 30 can be accessed in two directions, i.e., a direction from the rear and a lateral direction when the cartridge is attached.

A second embodiment in this mode of implementation will next be described.

Figure 17:
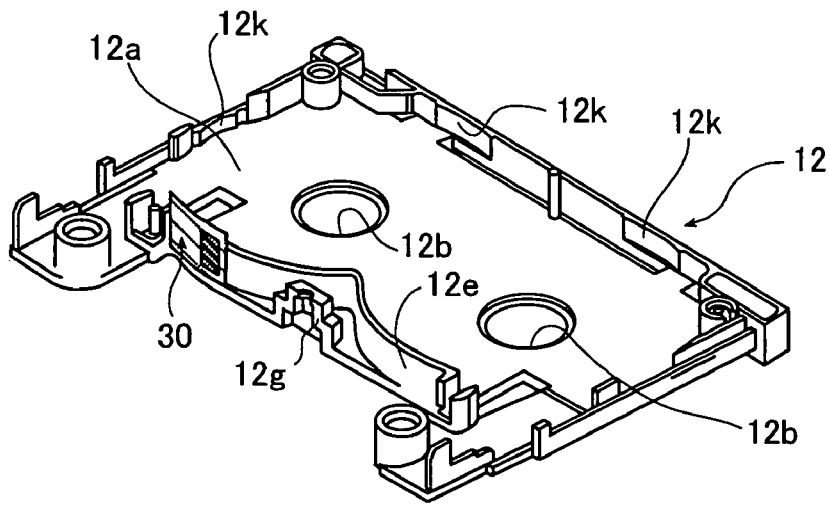
FIG. 17 is a schematic perspective view of a state of another embodiment in which a noncontact-type memory is mounted in the lower half of the magnetic tape cartridge (cassette) shown in FIG. 1.

Referring to FIG. 17, in the second embodiment, a cartridge memory 30 which, like that in the first embodiment, is curved so as to conform to the circumferential (outermost) configuration of one magnetic tape winding accommodated in the cartridge case when the diameter of the tape winding is maximized is mounted in place of a cut portion of the reel area rib 12e of the lower half 12, the curvature of the cartridge memory 30 being adjusted to that of the reel area rib 12e. Thus, the cartridge memory 30 forms (a portion of) the reel area inner wall surface.

The reel area wall portion formed by replacing a portion of the reel area rib 12e with the cartridge memory 30 becomes weak in strength. However, since the reel area rib 12e is cut only partially, and since it is possible to leave an end portion of the reel area rib 12e, a sufficient strength of the reel area rib 12e can be maintained.

Alternatively, a portion of the reel area rib 12e may be reduced in thickness instead of being cut to mount the cartridge memory 30. The cartridge memory 30 is attached to the portion reduced in thickness. In such a case, the cartridge memory 30 may be attached to the outer surface of the reel area rib 12e or may be attached to the inner surface of the reel area rib 12e after being bent so as to have a reverse curvature.

In the above-described embodiments, a curved cartridge memory is mounted by utilizing its curved shape. Therefore the cartridge memory can be mounted without requiring a space specially spared in the cartridge case, and can be incorporated even in a small cartridge case without impairing various functions in the cartridge case.

The present invention is not limited to the above-described magnetic tape cartridge. The present invention can also be applied to a one-reel type magnetic tape cartridge and to cartridges and the like other than the magnetic tape cartridge, e.g., recording medium cartridges containing recording mediums such as magnetic disks and optical recording mediums. In the case of an application to a one-reel type magnetic tape cartridge, the cartridge memory may be curved so as to conform to the circumferential configuration of the reel and may be attached at any given position to form a reel area inner wall surface.

The magnetic tape cartridges in the third mode of implementation of the present invention have been described in detail. Needless to say, the present invention is not limited to the above-described examples and various improvements or changes therein may be achieved without departing from the scope of the invention.

According to the third mode of implementation of the present invention, as described above, a noncontact-type memory (cartridge memory) can easily be incorporated even in a small cartridge case without changing the structure of the cartridge case.

A recording medium cartridge in a fourth mode of implementation of the present invention will be described with reference to FIGS. 1 through 3, FIG. 5, and FIGS. 18 through 21.

Before describing various embodiments of the recording medium cartridge in the fourth mode of implementation of the present invention, the construction of a recording medium cartridge to which the present invention is applied will be described.

As a first object of application of the present invention in the fourth mode of implementation, a one-reel type magnetic tape cartridge will be described which has a flat cartridge case made of a hard plastic and constituted by a lower half having a flat rectangular shape and an upper half having a planar shape similar to that of the lower half and superposed on the lower half, the upper and lower halves being fastened to each other by fastening means such as screws screwed into four corner portions, and in which a single magnetic tape reel (hereinafter referred to simply as "reel") on which a magnetic tape is wound is rotatably accommodated in the cartridge case.

Figure 18:
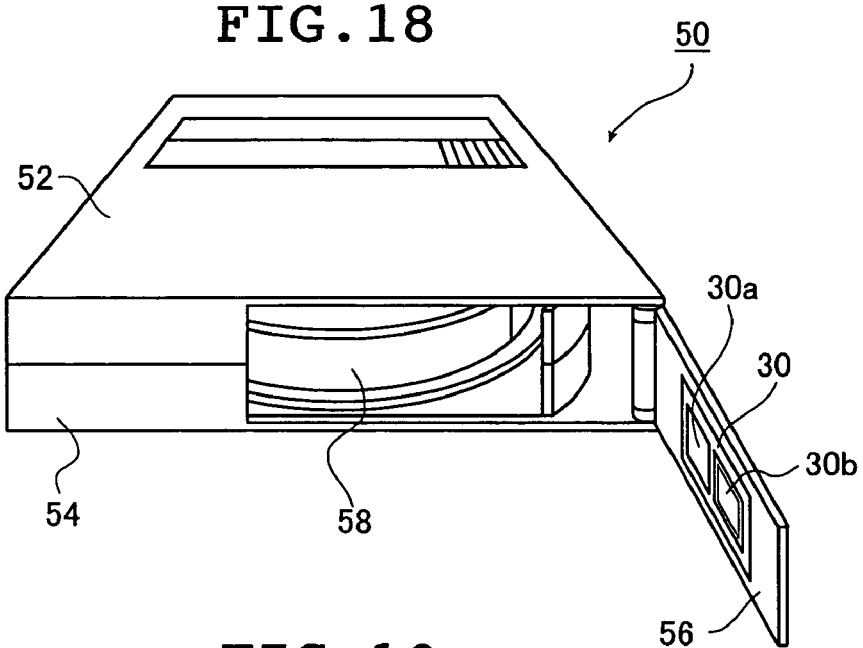
FIG. 18 is a schematic perspective view of a magnetic tape cartridge representing a recording medium cartridge in one embodiment of the present invention in a fourth mode of implementation, showing an example of mounting of a noncontact-type memory on the magnetic tape cartridge.

FIG. 18 shows a state in which the above-described cartridge memory 30 (see FIG. 5) is mounted in a magnetic tape cartridge 50 of the above-described construction, which represents a first embodiment in this mode of implementation. In this embodiment, the cartridge memory 30 is mounted on the inner surface of a lid 56 for closing an opening formed in a side wall portion of the cartridge case of the cartridge 50 constituted by an upper half 52 and a lower half 54. In mounting the cartridge memory 30, the cartridge memory 30 is fixed by, for example, a screw passed through its portion inside the data communication antenna section 30b (see FIG. 5) of the cartridge memory 30.

When the thus-constructed cartridge 50 in this embodiment is loaded in a recording and reproduction apparatus (deck), the lid 56 at the opening is opened by a lid opening means provided in the recording and reproduction apparatus to draw out the magnetic tape 58 accommodated therein and the cartridge memory 30 mounted on the inner surface of the lid 56 is exposed, thereby enabling data communication between the cartridge memory 30 and a data reader/writer in the deck without hindrance.

That is, the lid 56 at the opening of the magnetic tape cartridge 50 in the above-described embodiment is normally closed to protect the cartridge memory 30 against damages from the outside. When the magnetic tape cartridge 50 is loaded in a recording and reproduction apparatus, the lid 56 at the opening is opened to enable the magnetic tape 58 accommodated in the cartridge to be drawn out. The cartridge memory 30 is thereby exposed to enable data communication (transmitting/receiving) between the cartridge memory 30 and a data reader/writer of the recording and reproduction apparatus without hindrance and free from the influence of any intervening matter.

As a second object of application of the present invention in the fourth mode of implementation, a disk cartridge will be described which has a flat cartridge case made of a hard plastic and constituted by an upper half and a lower half each having a flat substantially rectangular shape, the upper and lower halves being superposed on and fastened to each other at respective four corner portions, and in which a magnetic disk, an magneto-optical disk or the like is rotatably accommodated in the cartridge case.

Figure 19:
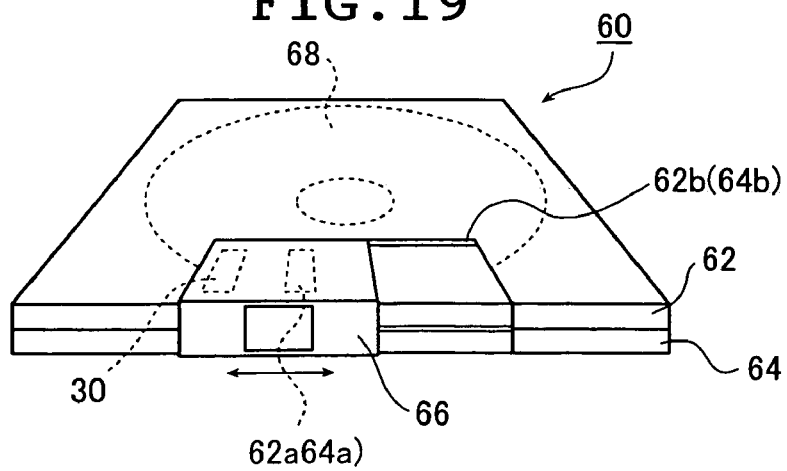
FIG. 19 is a schematic perspective view of a magnetic tape cartridge in a further embodiment of the present invention.

FIG. 19 shows a state in which the above-described cartridge memory 30 is mounted in a magnetic disk cartridge 60 which represents a second embodiment in this mode of implementation, and which has a slide type shutter similar to that of a floppy disk (FD). The magnetic disk cartridge 60 is constituted by an upper half 62 and a lower half 64, and a magnetic disk 68 is accommodated between the upper and lower halves 62 and 64.

The upper half 62 and the lower half 64 respectively have openings 62a and 64a opposite from each other. A shutter 66 is provided which catches two surface portions of the upper and lower halves 62 so as to be slidable along slide grooves 62a and 64a respectively formed in the (upper and lower) surfaces of the upper and lower halves 62 and 64. The shutter 66 is urged by a spring (not shown) normally in the direction to close the openings 62a and 62b.

The above-described cartridge memory 30 is mounted in the vicinity of the opening 62a of the upper half 62 which is normally protected by the shutter 66. When the magnetic disk cartridge 60 is loaded in a recording and reproduction apparatus, the shutter 66 closing the opening 62a is opened by a shutter opening means provided in the recording and reproduction apparatus to expose the cartridge memory 30, which is mounted in the surface of the upper half 62, and which is normally located under a shutter portion.

In the magnetic disk cartridge 60 of this embodiment, the shutter 66 normally closing the opening 62a and protecting the cartridge memory 30 against damages from the outside is opened to expose the cartridge memory 30 when the magnetic disk cartridge 60 is loaded in a recording and reproduction apparatus, thereby enabling data communication between the cartridge memory 30 and a data reader/writer of the recording and reproduction apparatus without hindrance and free from the influence of any intervening matter.

As a third object of application of the present invention in the fourth mode of implementation, a two-reel type magnetic tape cartridge will be described which has a flat cartridge case made of a hard plastic and constituted by a lower half having a flat rectangular shape and an upper half having a planar shape similar to that of the lower half and superposed on the lower half, the upper and lower halves being fastened to each other by fastening means such as screws screwed into four corner portions, and in which a magnetic tape wound around a pair of rotatable winding hubs is accommodated in the cartridge case.

Figure 20:
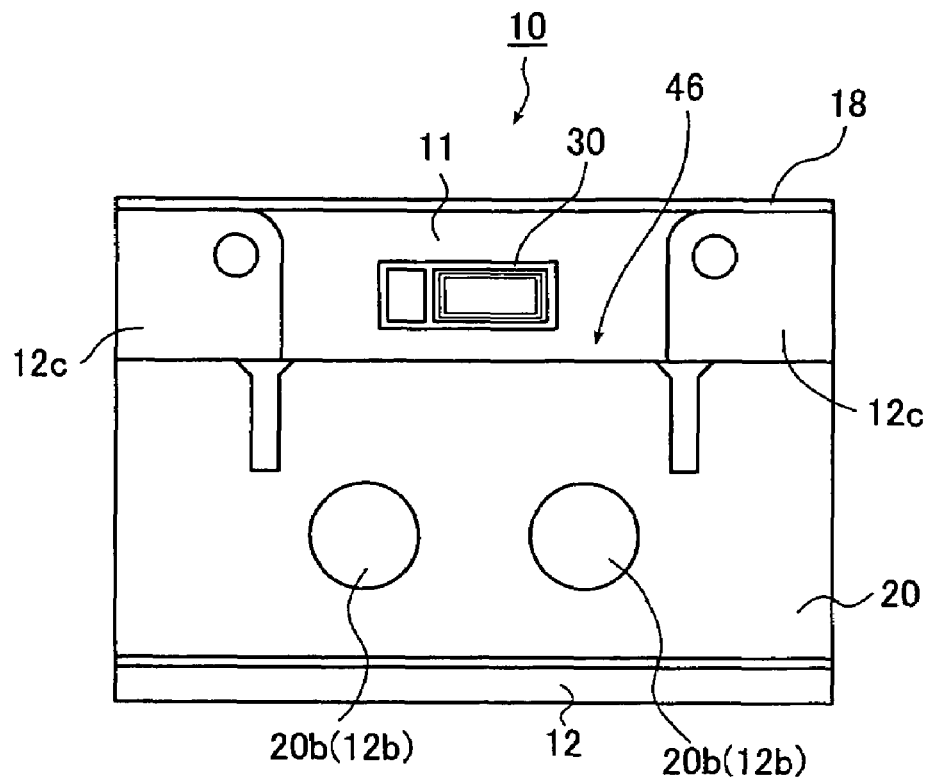
FIG. 20 is a bottom view of a magnetic tape cartridge in a further embodiment of the present invention.

FIG. 20 shows a state in which the above-described cartridge memory 30 is mounted in the above-described magnetic tape cartridge 10 in a third embodiment in this mode of implementation. In this embodiment, the cartridge memory 30 is mounted on a lower (inner) surface portion of the upper half 11 of the cartridge 10 corresponding to an opening 46 formed when the slider 20 recedes. In mounting the cartridge memory 30, the cartridge memory 30 is fixed by a screw passed through its portion inside the antenna section 30b.

Preferably, in mounting the cartridge memory 30 in the lower (inner) surface portion of the upper half 11 of the cartridge 10, the peripheral portion of the position at which the cartridge memory 30 is attached is recessed sufficiently deeply for the purpose of avoiding unnecessary interference with the magnetic tape 16 when it runs in the magnetic tape cartridge 10.

In the thus-constructed magnetic tape cartridge 10 of this embodiment, the opening 46 is normally closed by the slider 20. When the magnetic tape cartridge 10 is loaded in a recording and reproduction apparatus, a tape loading device provided in the recording and reproduction apparatus causes the slider 20 to recede to uncover the opening 46. The cartridge memory 30 mounted on the inner surface of the upper half 11 of the magnetic tape cartridge 10 is thereby exposed to enable data communication (transmitting/receiving) between the cartridge memory 30 and a data reader/writer of the recording and reproduction apparatus without hindrance.

Figure 21:
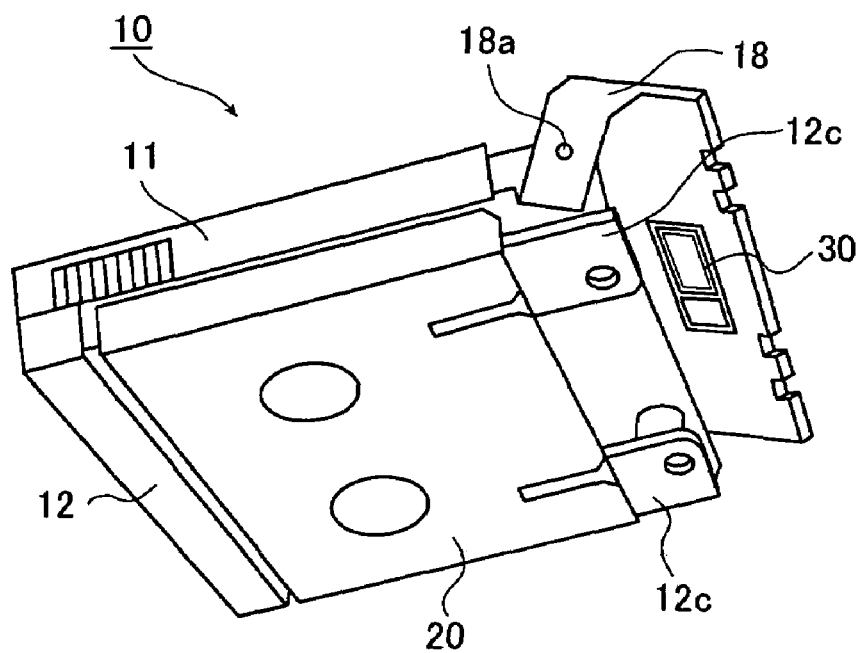
FIG. 21 is a schematic perspective view of a magnetic tape cartridge in a further embodiment of the present invention.

FIG. 21 shows a state in which the above-described cartridge memory 30 is mounted in the above-described magnetic tape cartridge 10 in a fourth embodiment in this mode of implementation. This embodiment differs from the third embodiment shown in FIG. 20 in that the cartridge memory 30 in this embodiment is mounted on the inner surface of the lid 18 rotatably attached to the upper half 11 of the cartridge 10. In mounting the cartridge memory 30, the cartridge memory 30 is fixed by a screw passed through its portion inside the antenna section 30b.

Preferably, an inner surface portion of the lid 18 including the portion to which the cartridge memory 30 is attached is recessed sufficiently deeply for the same purpose as in the embodiment 3, i.e., for the purpose of avoiding unnecessary interference with the magnetic tape 16 when it runs in the cartridge 10.

In the thus-constructed magnetic tape cartridge 10 of this embodiment, the cartridge memory 30 is normally protected against damages from the outside by the closed lid 18. When the magnetic tape cartridge 10 is loaded in a recording and reproduction apparatus, a tape loading device provided in the recording and reproduction apparatus opens the lid 18 to expose the cartridge memory 30 mounted on the inner surface of the lid 18 of the cartridge 10, thereby enabling data transmitting/receiving between the cartridge memory 30 and a data reader/writer of the recording and reproduction apparatus without hindrance.

In an embodiment based on a concept totally different from the above, for example, the cartridge memory 30 mounted on the inner surface of the lid 18 of the above-described cartridge 10 may be allowed to lightly contact the magnetic tape 16 to such a degree that running of the magnetic tape 16 is not adversely affected.

In this embodiment, while the same effects achieved in each of the above-described embodiments are maintained as much as possible, it is possible to achieve an effect of preventing jamming (deviating from the proper path and being stuck in a different path, for example) of the magnetic tape 16 due to accumulation of electric charge on the magnetic tape 16 caused during running or slack caused in the magnetic tape 16 when the tape is stopped.

Needless to say, the embodiments described above are for illustrative purpose only and the invention is not limited to the described embodiments.

According to the fourth mode of implementation of the present invention, as described above in detail, a recording medium cartridge can be provided which is free from any hindrance to data transmitting/receiving between a noncontact-type memory (cartridge memory) mounted in the recording medium cartridge and a recording and reproduction apparatus (deck) when the recording medium cartridge is set in the recording and reproduction apparatus.

More specifically, the cartridge memory is mounted on an internal portion of the recording medium cartridge such that, normally, that is, when the recording medium cartridge is not used, the cartridge memory is protected by some protective member, however when the recording medium cartridge is used, that is, the recording medium cartridge is loaded in a recording and reproduction apparatus, the protective member recedes to expose the cartridge memory, thereby enabling seamless data communication (transmitting and receiving) between the exposed cartridge memory and a data reader/writer of the recording and reproduction apparatus.

A recording medium cartridge in a fifth mode of implementation of the present invention will next be described with reference to FIGS. 1 through 3, FIG. 5, and FIGS. 22 through 26.

An embodiment of the present invention based on the arrangement shown in FIGS. 1 through 3 will be described as a typical example of the recording medium cartridge in the fifth mode of implementation of the present invention. Needless to say, the present invention in this mode of implementation is not limited to the illustrated example of the magnetic tape cartridge, and can also be applied to magnetic tape cartridges of other constructions and to cartridges and the like other than magnetic tape cartridges, e.g., recording medium cartridges containing magnetic recording mediums such as magnetic disks, and recording medium cartridges containing optical recording mediums such as magneto-optical discs and optical discs.

In the fifth mode of implementation of the present invention, a cartridge memory conventionally incorporated in a recording medium cartridge such as a magnetic tape cartridge is mounted on an outer surface of a cartridge case formed by combining an upper case member and a lower case member to solve the above-described problems of the conventional arrangements incorporating cartridge memories.

However, in a case where a cartridge memory is provided on an outer surface of cartridge case, problems described below may arise depending upon the place in which the cartridge memory is mounted and the mounting method.

That is, when the cartridge is loaded into or unloaded from a drive, a deck or the like, there is a possibility of the cartridge memory mounted on the outer surface of the cartridge being caught by some member to become obstructive to loading or unloading. Also, when the cartridge is carried or operated, an external force may be exerted directly to the cartridge memory mounted on the outer surface to damage the cartridge memory.

In embodiments of the present invention described below, in view of these problems in the case of mounting a contact memory (cartridge memory) on the outer surface of a cartridge case, an outer surface portion of a cartridge to which a cartridge memory is attached is recessed so as to avoid obstruction to loading of the cartridge into a recording and reproduction apparatus.

The specific examples of the mounting method will be described in the following embodiments.

A first embodiment in the fifth mode of implementation of the present invention will first be described.

Figure 22:
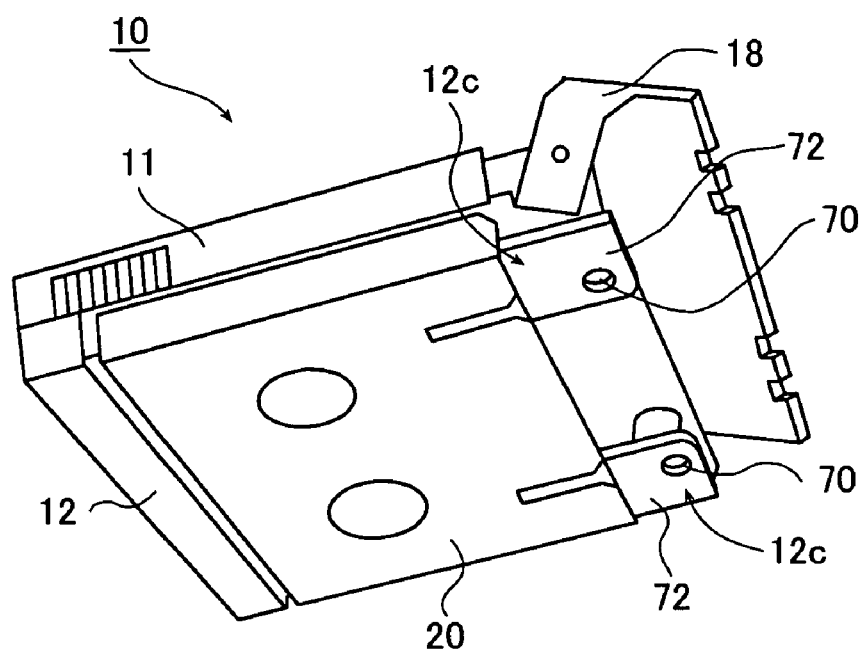
FIG. 22 is a schematic perspective view of a recording medium cartridge in one embodiment of the present invention in a fifth mode of implementation, showing a state of a magnetic tape cartridge as seen obliquely below, in which the upper half, lower half, slider, etc., shown in FIG. 1 are combined, and in which a noncontact-type memory is mounted.

FIG. 22 shows a perspective view of the magnetic tape cartridge 10 as seen obliquely from below, in which the upper half 10, the lower half 12, the slider 20, etc., shown in FIG. 1 are assembled.

In the state shown in FIG. 22, the slider 20 is at the position at which it uncovers the bottom-side opening of the cartridge case (the receding-side of the cartridge case), and the front lid 18 is opened upward to open the front side of the cartridge case. Since the slider 20 is at the receding position, the pair of extensions 12c at the front left and right ends of the lower half 12> are exposed. When the cartridge 10 is inserted into a deck, positioning pins (not shown) on the deck side are inserted into positioning pin insertion holes 70 formed in the extensions 12c, thereby fixing the position of the cartridge 10 in the deck. That is, the positioning pin insertion holes 70 are portions for positioning the cartridge 10 when the cartridge 10 is loaded in the deck. Also, surfaces in which the positioning pin insertion holes 70 are opened function as reference surfaces when the cartridge 10 is loaded in the deck.

Figure 23:
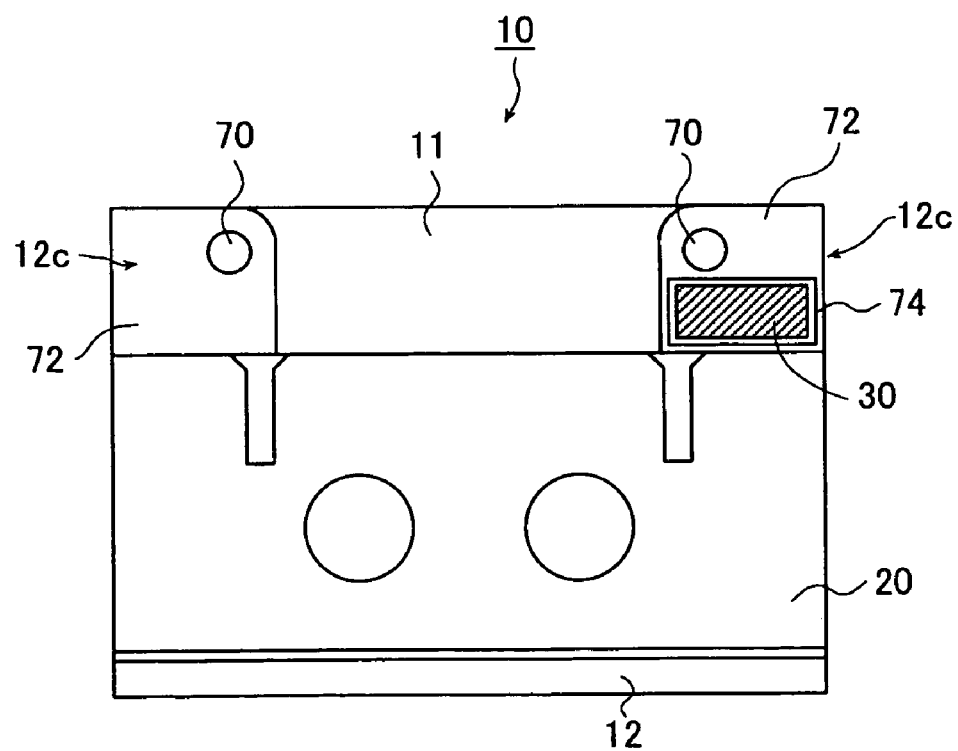
FIG. 23 is a bottom view of the magnetic tape cartridge shown in FIG. 22.

FIG. 23 is a bottom view of the cartridge 10 shown in FIG. 22. In this embodiment, as shown in FIG. 23, a recess 74 is formed in a place 72 in the vicinity of the portion around the positioning pin insertion hole 70 of one of the pair of extensions 12c at the front left and right ends of the lower half 12 which serves as the reference surface, and the cartridge memory 30 is mounted in this recess 74. As shown in FIG. 5, the cartridge memory 30 is constituted by a member in the form of a rectangular plate. An antenna section 30b is provided along the circumference of the rectangular member, and an IC chip 30a is placed inside the rectangular member. All the components of the cartridge memory 30 are encapsulated in a resin. As described above, the antenna section 30b is a coil antenna which supplies the IC section 30a with a current induced by electromagnetic induction from a magnetic field produced by an antenna of a deck-side data reader/writer (not shown) for reading data from or writing data to the cartridge memory 30. The portion 30c of the cartridge memory 30 has no particular function.

It is desirable that the depth of the recess 74 is set to be larger than the thickness of the cartridge memory 30 to avoid obstruction of the cartridge memory 30 to the movement of the slider 20 when the slider 20 moves toward the front of the cartridge case.

Thus, in this embodiment, a recess is formed in the vicinity of the portion which serves as a reference surface for positioning the cartridge when the cartridge is loaded in a deck, and the cartridge memory is placed in the recess, so that the accuracy with which the cartridge memory is positioned is improved to ensure reliable read/write from or to the cartridge memory.

Next, a second embodiment in this mode of implementation will be described.

Figure 24:
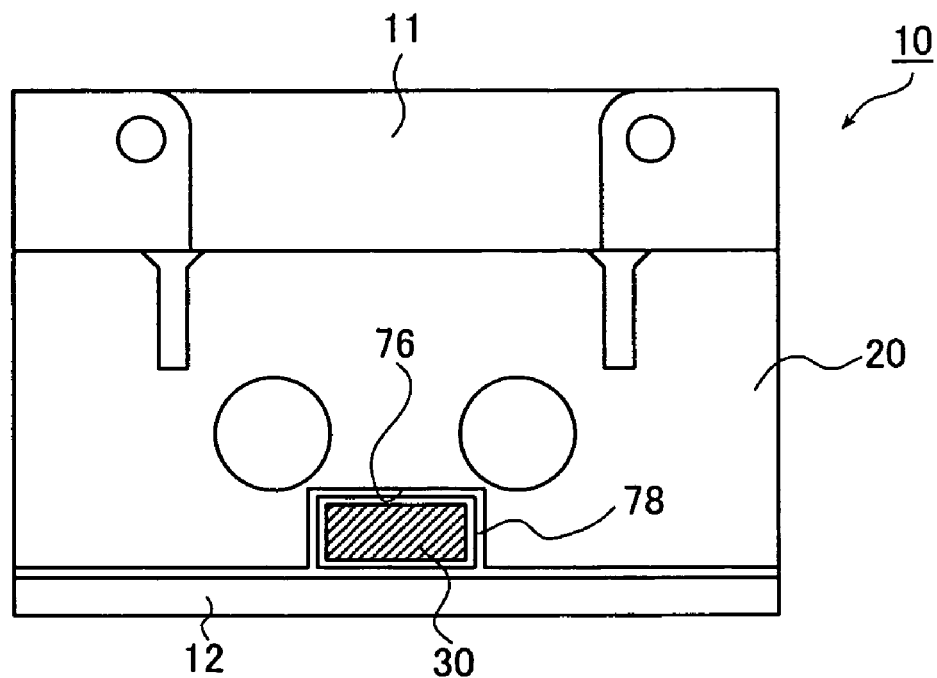
FIG. 24 is a bottom view of a magnetic tape cartridge in a further embodiment of the present invention.

FIG. 24 shows a magnetic tape cartridge which represents a second embodiment in this mode of implementation. FIG. 24 is a bottom view similar to FIG. 23. The slider 20 of the cartridge 10 in this embodiment has a rectangular cut 76 formed in its rear end portion. In this embodiment, as shown in FIG. 24, a recess 78 is formed in a portion of the lower half 12 coinciding with the rectangular cut 76 when the slider is at the receding position, and the cartridge memory 30 is mounted in this recess 78.

In this embodiment, only minor changes in molds used for molding the component parts of the cartridge are necessary to form the cut 76 in the slider 20 and to form the recess 78 in the portion of the lower half 12 corresponding to the cut 76. Thus, this embodiment has the advantage of enabling a memory cartridge to be easily added to and mounted in current products.

Since the slider 20 has the cut 76, the slider 20 does not contact the cartridge memory 30 even at the receding position. Therefore, the arrangement may alternatively be such that the cartridge memory 30 is attached to the outer bottom portion of the lower half 12 coinciding with the cut 76 without forming the recess 78 for receiving the cartridge memory 30 in the corresponding lower half portion. However, it is preferable to form a recess and to mount the cartridge memory in a sufficiently deep portion considering the positioning in mounting the cartridge memory and the protection of the cartridge memory.

Next, a third embodiment in this mode of implementation will be described.

Figure 25:
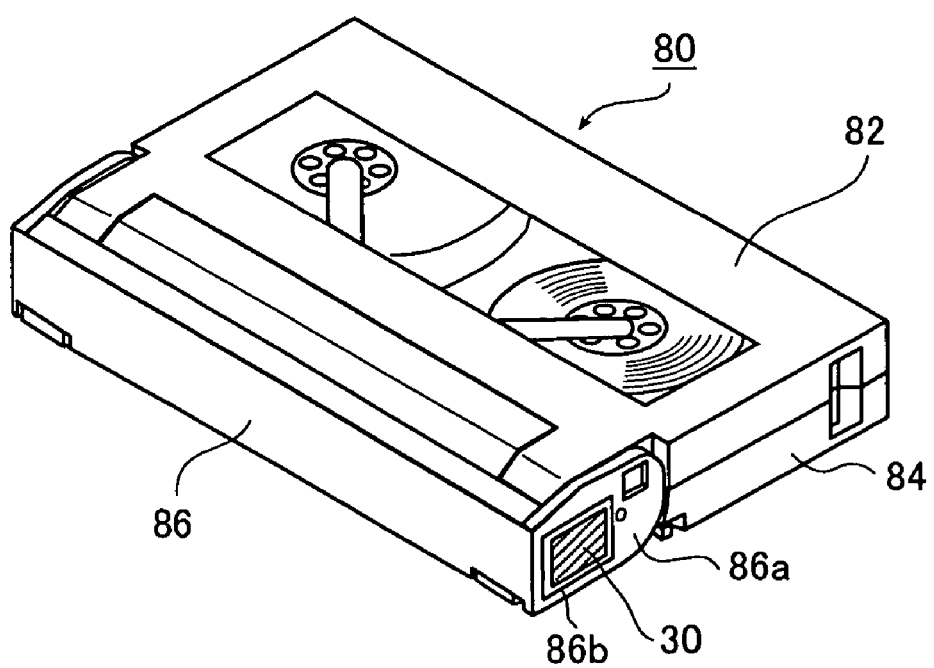
FIG. 25 is a perspective view of a magnetic tape cartridge in a further embodiment of the present invention.

FIG. 25 is a perspective view of a cartridge 80 of this embodiment. The cartridge 80 of this embodiment is constituted by an upper half 82, a lower half 84 and a lid 86 for covering the front side of the cartridge. A side surface 86a of the lid 86 at one end in the lengthwise direction of the lid 86 has some area. A recess 86b is formed in the side surface 86a and the cartridge memory 30 is mounted in this recess 86b.

Normally, the side surfaces of the lid at the ends in the lengthwise direction are formed by using a slide core during molding. Therefore, the recess in which the cartridge memory is to be mounted can easily be formed in the side surface at one end in the lengthwise direction by changing the slide core on a mold with the one having a projection. Thus, also in this embodiment, it is easy change current products into the ones to which a cartridge memory is added.

Next, a fourth embodiment in this mode of implementation will be described.

Figure 26:
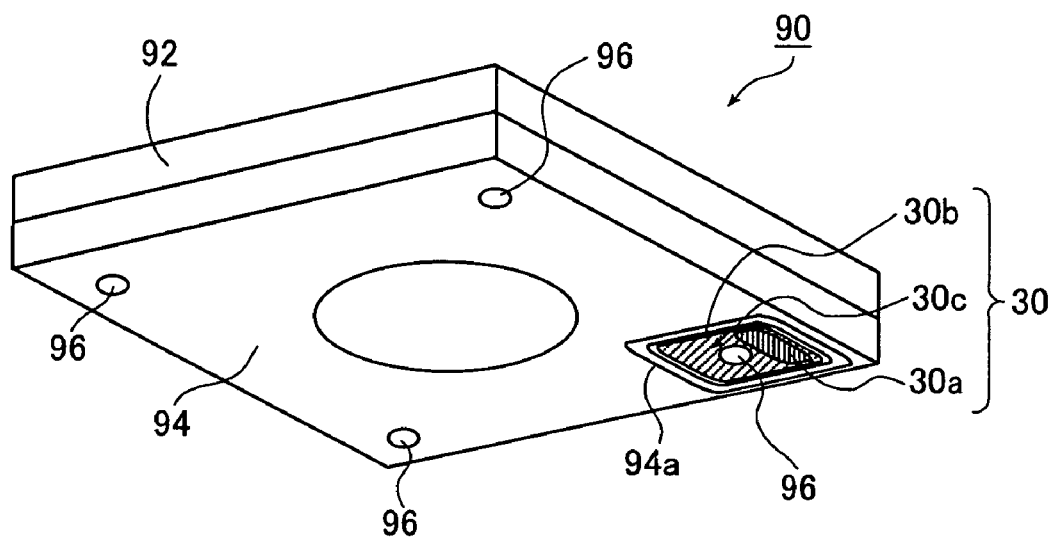
FIG. 26 is a perspective view of a magnetic tape cartridge in a further embodiment of the present invention as seen from below.

FIG. 26 is a perspective view of a magnetic tape cartridge 90 of this embodiment as seen from below. As shown in FIG. 26, the cartridge 90 of this embodiment has a cartridge case constituted by a lower half 94 having a rectangular planar shape and an upper half 92 having a shape similar to that of the lower half 94 and superposed on the lower half 94. The upper and lower halves 92 and 94 are fastened to each other by screws 96 screwed into four corner portions. A single magnetic tape reel on which a magnetic tape is wound is rotatably accommodated in this cartridge case.

In this embodiment, as shown in FIG. 26, a recess 94a is formed in an outer surface portion of the lower half 94 in the vicinity of a screw hole through which one of the screws for fastening the cartridge case is passed, and the cartridge memory 30 is mounted in the recess 94a. As shown in FIG. 26, the cartridge memory 30 is mounted on the cartridge case in such a manner that the portion 30c of the cartridge memory 30 shown in FIG. 5 is fastened by the screw 96 to the cartridge case while the upper and lower halves 92 and 94 are fastened to each other by the same screw.

As mentioned above, the portion 30c of the cartridge memory 30 relates to no operation, and there is no problem even if it is bored and fastened with the screw 96.

In this embodiment, the cartridge memory can be easily mounted in the ordinary cartridge assembly process without requiring any special member or means for mounting the cartridge memory.

In each of the embodiments in the fifth mode of implementation of the present invention, as described above in detail, the cartridge memory is mounted in a recess formed in an outer surface of the cartridge case, so that there is no possibility of the externally mounted cartridge memory being obstructive to the operation of inserting the magnetic tape cartridge into a drive, a deck, an automatic loader or a like apparatus. Also, as such the cartridge memory does not easily receive damages from the outside during handling other than loading and unloading.

Since the cartridge memory is externally mounted, it can be easily interchanged and can be easily removed to be reused. Further, the cartridge memory can be mounted in the final step in the cartridge assembly process and the need for checking the cartridge memory before mounting can be eliminated, so that the number of assembly steps is reduced.

The recording medium cartridges in the fifth mode of implementation of the present invention, typified by magnetic tape cartridges, have been described in detail. Needless to say, the present invention is not limited to the above-described embodiments, and can also be applied to recording medium cartridges containing various recording mediums, e.g., magnetic recording mediums such as magnetic disks, and optical recording mediums such as magneto-optical discs, as well as to various magnetic tape cartridges. Also, various improvements or changes in the described embodiments may be achieved without departing from the scope of the invention.

In the fifth mode of implementation of the present invention, as described above, a noncontact-type memory (cartridge memory) is mounted in a recess formed in the outer surface of the recording medium cartridge. Therefore the cartridge memory does not obstruct the insertion of the magnetic tape cartridge into a recording and reproduction apparatus. Also, the cartridge memory does not easily receive damages from the outside during handling other than loading and unloading. Also, the cartridge memory can be easily interchanged and can be easily removed to be reused. Further, the cartridge memory can be mounted in the final step in the cartridge assembly process and the need for checking the cartridge memory before mounting can be eliminated, so that the number of assembly steps is reduced.

A cartridge label for a recording medium cartridge in a sixth mode of implementation of the present invention will be described with reference to FIGS. 27 through 30B.

Figure 27:
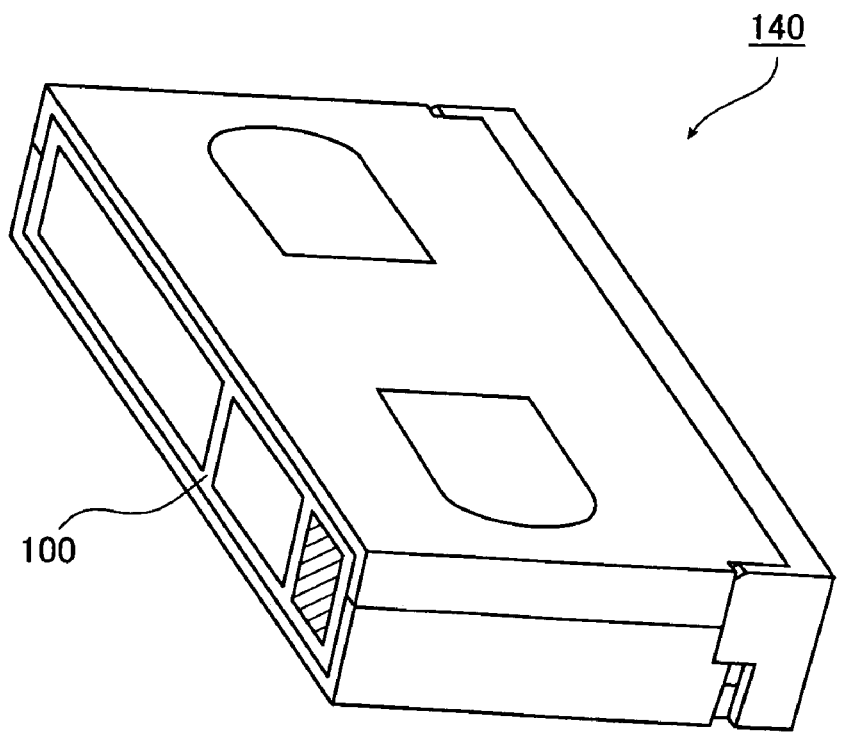
FIG. 27 is a perspective view of an application example of a video tape cassette which is an application target of a recording medium cartridge label in a sixth mode of implementation of the present invention.

FIG. 27 is a perspective view of an example of a video tape cassette to which a recording medium cartridge label in the sixth mode of implementation of the present invention is applied.

Referring to FIG. 27, a cartridge label 100 in this mode of implementation is attached as a back label to the back surface of a video tape cassette (hereinafter referred to simply as "video cassette") 140 known as a type of recording medium cartridge. The cartridge label 100 is intended to enable a user to easily confirm information on the recording time and contents of data (video data) recorded in the video cassette 140.

To achieve such an object, a method has been commonly practiced in which information is recorded by handwriting or printing on the conventional cartridge label attached as a back label to the back surface of the video cassette 140. In recent years, a method has been proposed in which a cartridge memory formed as a noncontact-type memory (IC memory) including the above-described IC chip and antenna section is embedded in the conventional cartridge label and noncontact magnetic recording in this cartridge memory is performed in addition to recording by handwriting or the like. Significant improvements in cartridge labels in terms of convenience realizable by such methods are being expected. However, cartridge labels based on the conventional art have been designed without due consideration for the protection of the antenna section, although protection of the IC chip in the cartridge memory is taken into consideration. For this reason, no significant improvement in the effect of preventing damage (disconnection or the like) to the antenna conductor (coil) has been achieved, as described above.

It is to be noted here that while protection of the IC chip requires a method of protecting the IC chip as a continuous area of a predetermined size, the antenna section occupies a looped area and it is effective to positively utilize, as a separate area, the area defined inside the looped antenna area.

Figure 28:
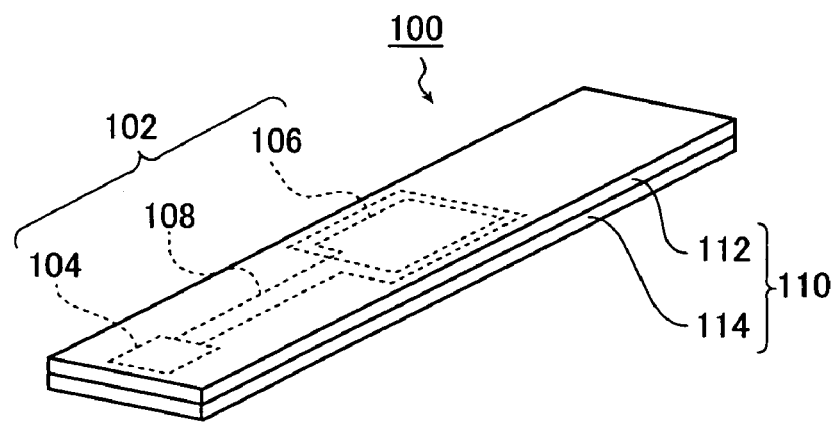
FIG. 28 is a perspective view of the basic construction of a cartridge label in accordance with one embodiment of the present invention.

As a cartridge label 100 in this mode of implementation, one having a cartridge memory 102 embedded therein, as shown in FIG. 28, is used. For example, an IC section 104 for storing information and processing signals, an antenna section 106 capable of being supplied with electric power and transmitting and receiving information, and lead wires 108 connecting the IC section 104 and the antenna section 106 are embedded in a label base 110 constituting a cartridge label 100. The label base 110 is constituted by a main label member 112 and a double-faced tape 114 adhered to the lower surface (as viewed in FIG. 28) of the main label member 112.

Figure 29:
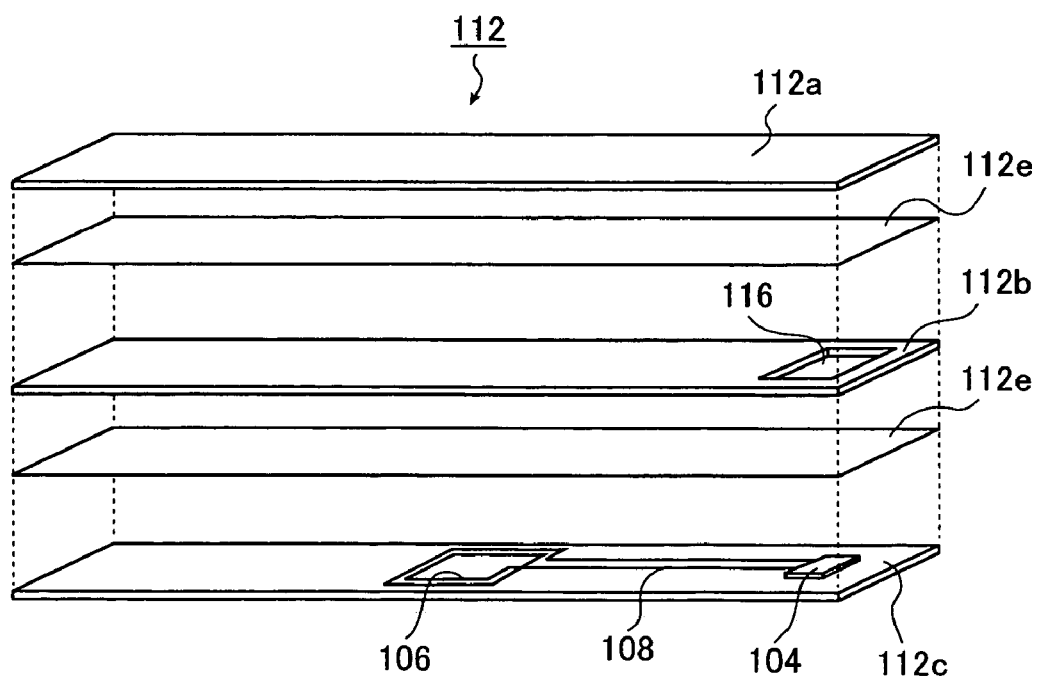
FIG. 29 is an exploded perspective view of the detailed structure of a label base of the cartridge label shown in FIG. 28.

The main label member 112 includes, as shown in FIG. 29, coated paper 112a, a reinforcement member 112b, a polyimide substrate 112c supporting the IC section 104 and the antenna section 106, and pressure-sensitive adhesive layers 112e for bonding these members. The coated paper 112a, the reinforcement member 112b and the polyimide substrate 112c are bonded to each other by two pressure-sensitive adhesive layers 112e interposed therebetween, thus integrally forming the main label member 112.

Considering the protrusion of the IC section 104 from the polyimide substrate 112c, a cut (hole) 116 for protecting the IC section 104 from impacts is formed in the reinforcement member 112b at a position corresponding to the mounting position of IC section 104 mount position.

The cartridge memory 102 used in the cartridge label has such a construction that the IC section 104 and the antenna section 106 are formed separately and are connected by lead wires 108. That is, as shown in FIG. 28, the IC section 104 of the cartridge memory 102 is positioned at one end of the video cassette 140 (see FIG. 27) while the antenna section 106 is positioned substantially at a center of the video cassette. The IC section 104 and the antenna section 106 are connected by lead wires 108.

On the label surface above these cartridge memory components, information, e.g., a name of a maker, the type of the video cassette, and the type of video tape accommodated in the video cassette are written (printed) in the IC section 104. Therefore, an area where a user is effectively prohibited of additional writing is formed.

On the antenna section 106, a frame-like trace slightly wider than the width of the looped bundle of antenna conductors is printed (for indication of protection of the antenna section), thereby emphasizing that the area inside the frame is one information writing section, i.e., an information writing area. As a method for making this information section easily distinguishable, a method of printing writing items such as "recording (broadcasting) date", "title", or the like may be used.

Further, this frame may be designated as a unified title section in the entire cartridge label area, or 7-segment figure-elements for entering numbering figures may be printed in advance to define the area inside the frame as an area for entering an item in an index covering a plurality of video cassettes. This method of making the area inside the frame easily distinguishable as a writing area (information writing area) is also effective.

This arrangement will be described in more detail.

Figure 30A:
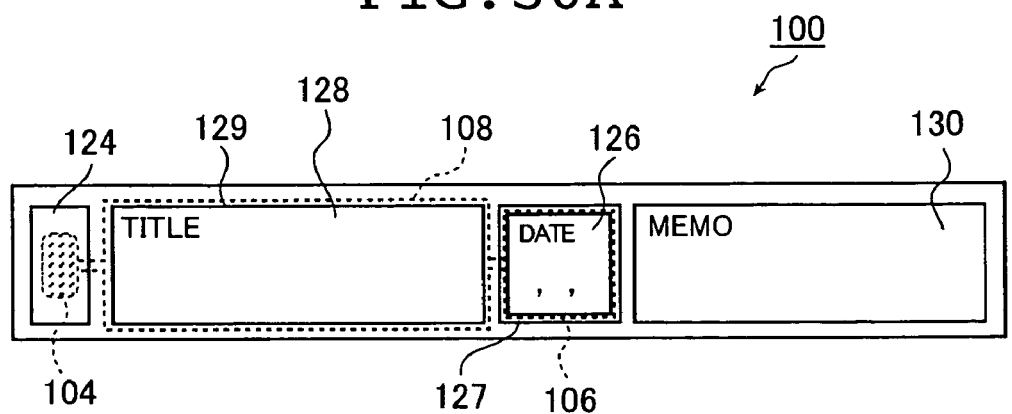
FIGS. 30A and 30B are diagrams showing external appearances of video cassette cartridge labels which are cartridge labels in one further embodiment of the present invention.
Figure 30B:
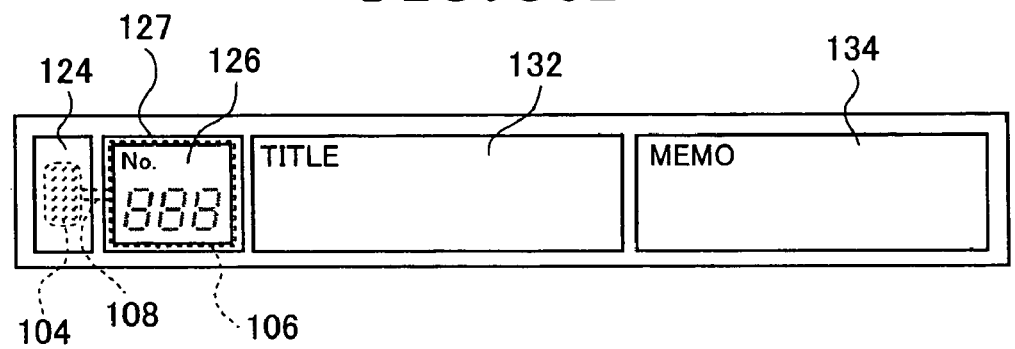
Figure 31:
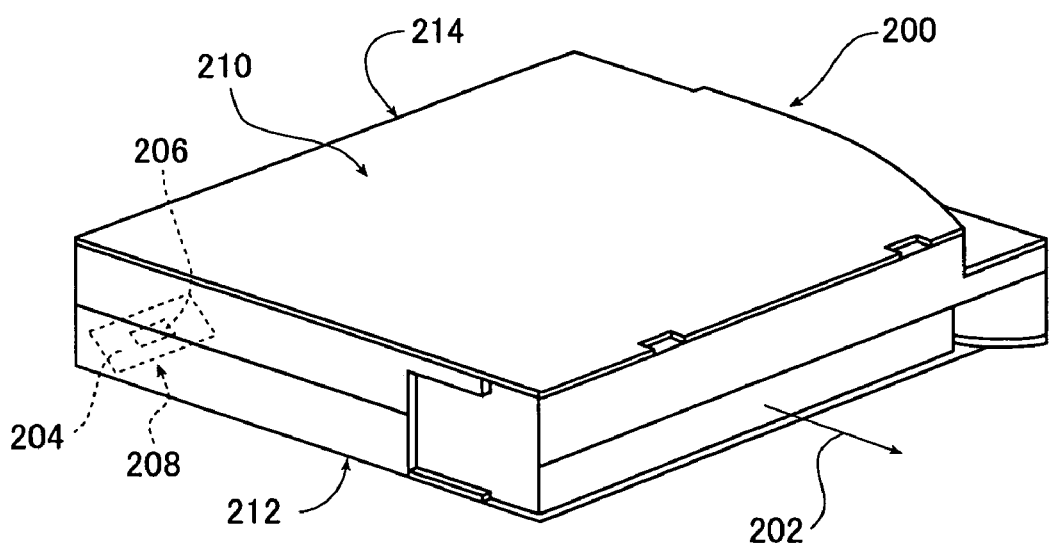
FIG. 31 is a schematic perspective view of an example of conventional magnetic tape cartridge.

FIGS. 30A and 30B are top views of examples of cartridge labels in the fifth mode of implementation of the present invention. As shown in FIGS. 30A and 30B, the IC section 104, the antenna section 106 and lead wires 108 connecting the IC section 104 and the antenna section 106 in the cartridge memory 102 which are contained in the cartridge label 100 are placed between the inner layers of the cartridge label 100, as indicated by the broken line.

On the surface of the cartridge label 100 above the IC section 104 and the antenna section 106, an IC protective writing section 124 and an antenna protective writing section (antenna section protection indication) 126 are respectively provided. In the IC protective writing section 124, information such as described above, e.g., a name of a maker of the video cassette 140 (see FIG. 27), the type of the video cassette, and the type of video tape accommodated in the video cassette 140 are written (printed) to define an area where a user is effectively prohibited of additional writings.

The antenna protective writing section 126 has a frame (antenna section protection indication) 127 having substantially the same configuration as the looped antenna and a little wider than the width of the looped bundle of antenna conductors. The frame 127 is intended to effectively prohibit a user of additional writings on the frame, thereby protecting the antenna. Also, the area inside the frame 127 serves as an information writing area on which a user can write information on data recorded by using the video cassette 140 (see FIG. 27).

For example, in the example shown in FIG. 30A, writing items such as "recording (broadcasting) date", "title", or the like is printed inside the frame 127 in advance to urge a user to write therein corresponding information on data recorded by using the video cassette 140.

In the example shown in FIG. 30B, a figure writing section is provided inside the frame 27 of the antenna protective section 126 in such a manner that 7-segement figure-elements for entering figures are printed in advance to facilitate numbering such as setting, for example, a preservation number of the video cassette 140 (see FIG. 27).

Thus, the antenna protective section 126 is designed to effectively use the area inside the frame 127 by urging a user to write information inside the frame 127 while inhibiting writing on the frame 127 to protect the antenna.

In the example shown in FIG. 30A, a lead protective writing section 128 is also provided on the cartridge label surface 100 above the lead wires 108. The lead protective writing section 128 is formed in such a manner that a frame 129 having substantially the same shape as the shape defined by the lead wires 108 is formed in the area bordered by the lead wires 108 to protect the lead wires 108. Also in the case of this lead wire protective writing section 128, a user writing is limited to the area inside of the frame 129, as is the case with the antenna protective writing section 126, thereby effectively prohibiting a user to write in the outside of the frame 129. The lead wires 108 are thus protected. Also, writing items such as "title" are printed to urge a user to write corresponding information. For the lead protective writing section 128 also, the frame 129 may also be formed so as to be slightly larger than the width of the bundle of lead wires 108, as is the case with the frame 127 defining the antenna protective writing section 126. If the frame 129 is formed in this manner, the lead wire protective writing section 128 can also have the same protective and effective-use effects as those of the antenna protective writing section 126.

In FIGS. 30A and 30B, portions 130, 132, and 134 represent ordinary writing sections having no IC protective or antenna protective function.

The thus-formed video cassette cartridge labels 100 in the mode of implementation have the advantages of reducing the possibility of damage to the antenna section 106 and damages to the lead wires 108 as well as the possibility of damage to the IC section 104 when some writing is made by a user on the labels with a ball-point pen or the like.

Also, for example, at a time, the video cassette 140 (see FIG. 27) on which the cartridge label is attached may be loaded in a recording and reproduction apparatus (not shown) to transmit or receive data between the cartridge memory 102 in the cartridge label 100 and read/write means provided in the recording and reproduction apparatus on the basis of the read/write means.

To carry out the method of providing an antenna section protection indication by forming on the surface of the cartridge label 100 the antenna protective writing section 126 for effectively inhibiting a user of writing, a method of forming the desired pattern by printing is the simplest. However, a method of preparing a seal adapted to the size of the antenna section in advance and attaching the seal to the cartridge is also advantageous in terms of flexibility with respect to changes in product specifications.

Preferably, the antenna protective writing section 126 is formed integrally with a certain design while indicating the area inside the looped antenna constituting the antenna section 106, i.e. the area inside the frame 127, is an information writing area. The expression "integrally with a certain design" denotes a state where the system for expression of the framed area covering the looped antenna is combined or associated with neighboring frames defining other areas to form one integral design as a whole.

Since the cartridge memory 102 formed as a noncontact-type memory is expensive, it is preferable to arrange the cartridge memory so that the memory can be reused. To do so, a method described below, for example, is preferably used. That is, the cartridge label 100 is constructed so as to be able to be inserted into and drawn out of slide grooves provided in a video cassette 150 constructed as a recording medium cartridge. When the video cassette 150 becomes unnecessary, the cartridge label 100 is drawn out of the slide grooves of the video cassette 150 and inserted into and held on another recording medium cartridge.

Needless to say, the embodiments described above are for illustrative purpose only and the invention is not limited to the described embodiments.

According to the sixth mode of implementation of the present invention, as described above in detail, a cartridge label can be realized which is attached to a recording medium cartridge and is designed with due consideration for the prevention of damage to the antenna section as well as the damage to the IC chip in the IC section of a noncontact-type memory (cartridge memory). Further, according to this mode of implementation, a cartridge label can also be realized which is designed also with the consideration for prevention of damage to lead wires in a case where the lead wires are required in addition to the IC chip in the IC section and the antenna section in a noncontact-type memory to connect the IC section and the antenna section.

What is claimed is:

1. A recording medium cartridge comprising:
a cartridge case containing a recording medium;
a noncontact-type memory having an IC section for storing information and performing signal processing, and an antenna section for transmitting and receiving signals; and
an accommodation portion for accommodating at least said antenna section of said noncontact-type memory and being formed inside said cartridge case,
wherein said accommodation portion has a groove for partially inserting at least said antenna section of said noncontact-type memory and being formed in a furthest region of an inner surface of said cartridge case furthest from metallic parts of said cartridge, and a pin for supporting a projected part of at least said antenna section of said noncontact-type memory projecting from said groove and longitudinally projecting adjacent to said groove, and
wherein the antenna section of said noncontact-type memory is placed in a region furthest from said metallic parts.

2. The recording medium cartridge according to claim 1, wherein said accommodation portion accommodates said noncontact-type memory having said IC section and said antenna section integrated with each other.

3. The recording medium cartridge according to claim 1, wherein said pin of said accommodation portion is projectingly provided at a position adjacent to said groove from an inner bottom surface of said cartridge case in a direction opposite to a depth direction of said groove in parallel with an inner wall surface of said cartridge case that is projectingly formed on said inner bottom surface, and said groove of said accommodation portion is formed in said inner bottom surface in a direction opposite to a projecting direction of said pin in parallel with said inner wall surface.

4. The recording medium cartridge according to claim 3, wherein said accommodation portion is formed in said inner surface in a rear side of said cartridge case.

5. The recording medium cartridge according to claim 1, wherein said cartridge case is constituted of an upper half and a lower halt and said groove and said pin of said accommodation portion are formed in said lower half.

6. The recording medium cartridge according to claim 1, wherein said cartridge case is constituted of an upper half and a lower halt and wherein said groove of said accommodation portion is formed at a position adjacent to an inner wall surface of said lower half that is projectingly formed on an inner bottom surface of said lower half in said inner bottom surface in a direction opposite to a projecting direction of said pin in parallel with said inner wall surface, and said pin of said accommodation portion is projectingly provided at a position adjacent to said groove from said inner bottom surface in a direction opposite to a depth direction of said groove in parallel with said inner wall surface.

7. The recording medium cartridge according to claim 1, wherein said recording medium cartridge is a magnetic tape cartridge.

8. The recording medium cartridge according to claim 1, wherein said recording medium cartridge is a two-reel type magnetic tape cartridge.

9. The recording medium cartridge according to claim 8, wherein said accommodation portion is formed in a central portion of said inner surface in a rear side of said cartridge case.

10. The recording medium cartridge according to claim 8, wherein said cartridge case is constituted of an upper half and a lower half, and wherein said groove of said accommodation portion is formed at a position adjacent to an inner wall surface in a rear side of said lower half that is projectingly formed on an inner bottom surface of said lower half in a central portion of said inner bottom surface in a direction opposite to a projecting direction of said pin in parallel with said inner wall surface, and said pin of said accommodation portion is projectingly provided at a position adjacent to said groove from said inner bottom surface in a direction opposite to a depth direction of said groove in parallel with said inner wall surface.

* * * * *